Aug. 11, 1942.　　L. H. DE WYK, JR　　2,292,366
RETRIEVING AND REENTERING LONG MOLD SECTIONS
Filed June 17, 1939　　7 Sheets-Sheet 1
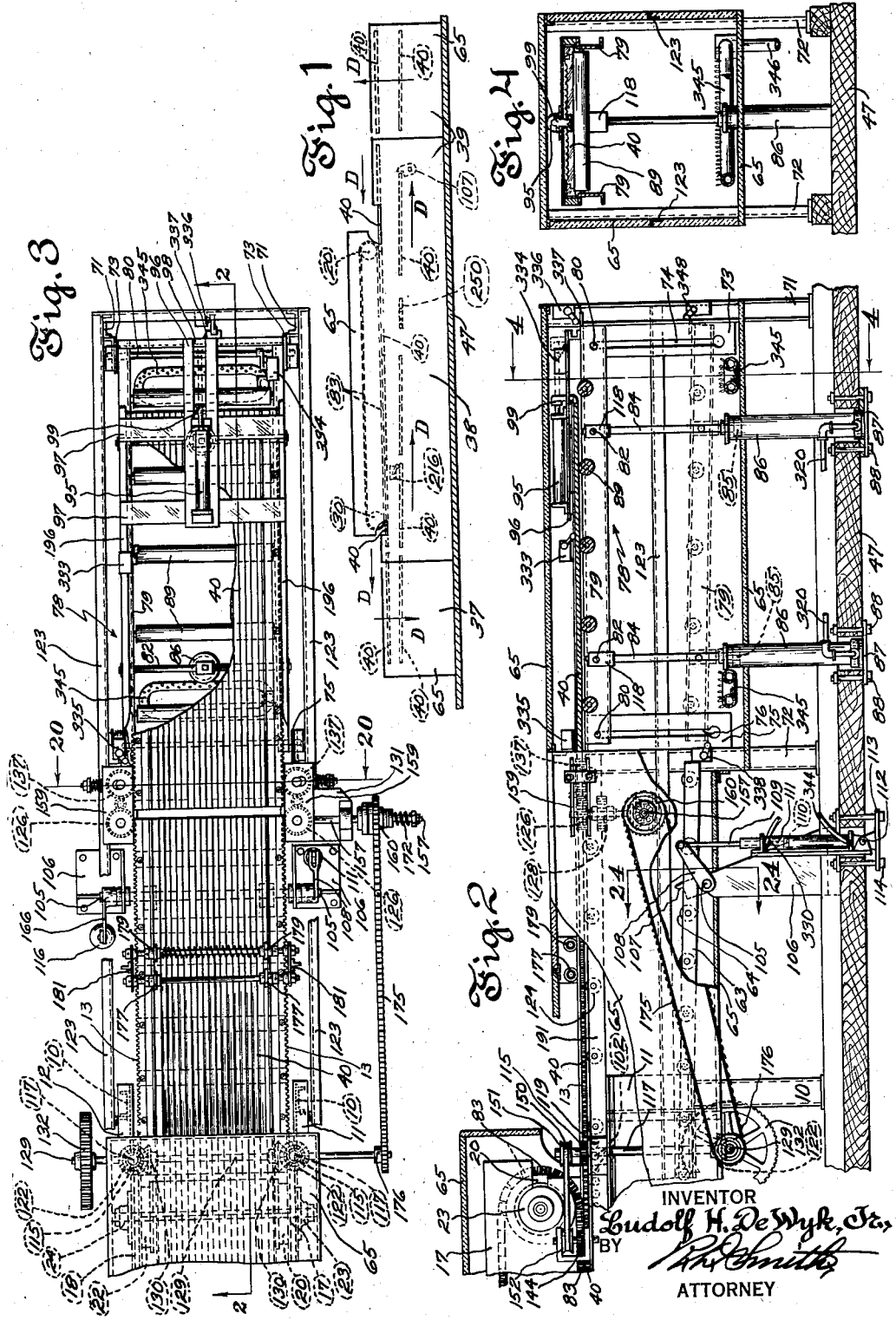
INVENTOR
Ludolf H. De Wyk, Jr.,
BY
ATTORNEY

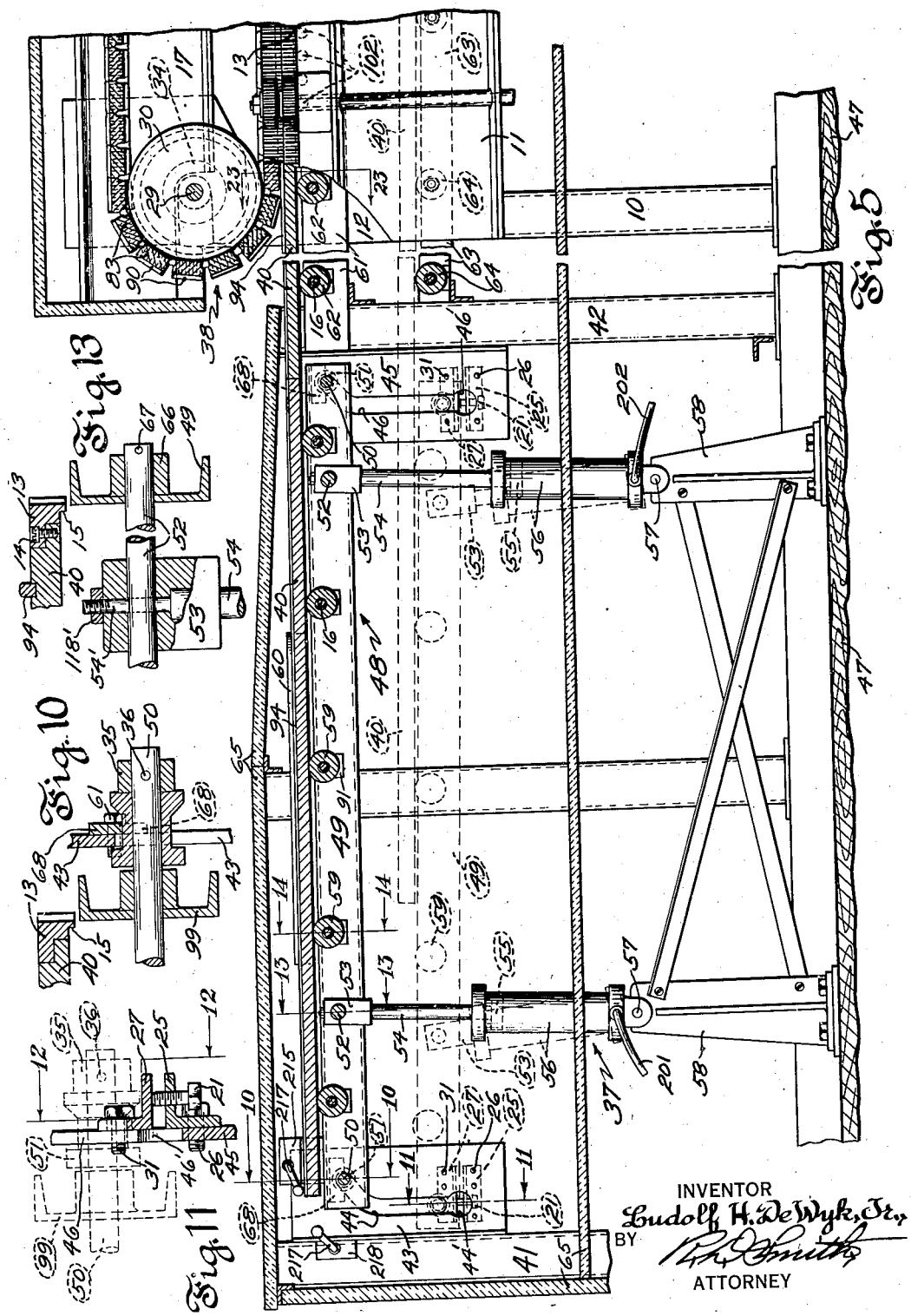

Aug. 11, 1942. L. H. DE WYK, JR 2,292,366
RETRIEVING AND REENTERING LONG MOLD SECTIONS
Filed June 17, 1939 7 Sheets-Sheet 3
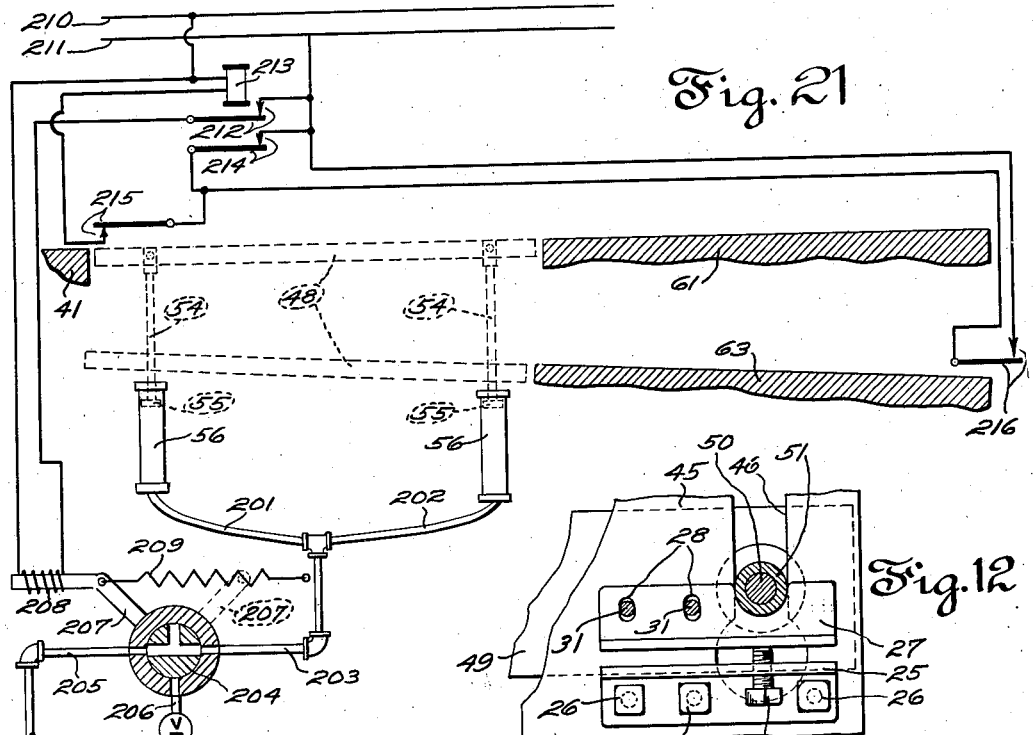
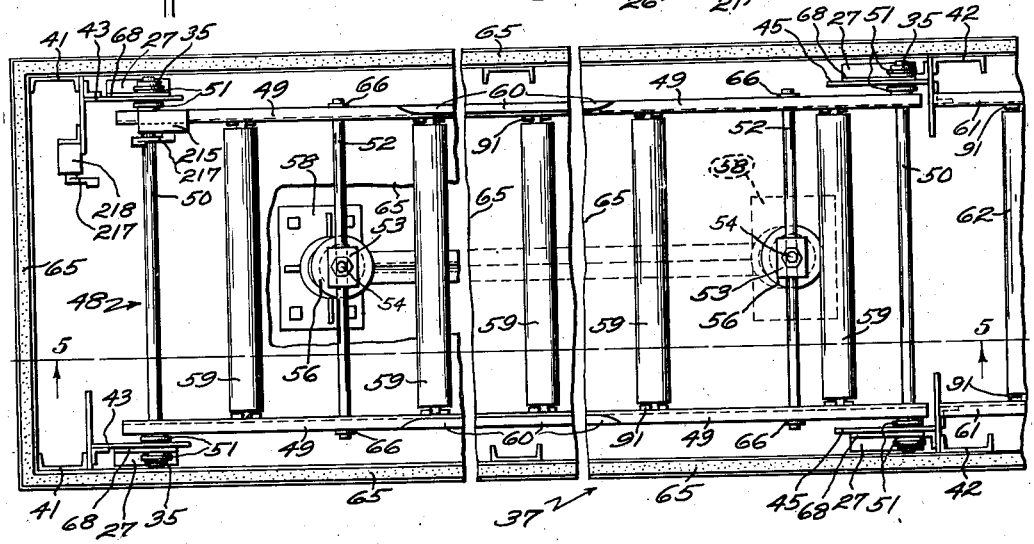
INVENTOR
Ludolf H. DeWyk, Jr.,
BY
ATTORNEY Aug. 11, 1942. L. H. DE WYK, JR 2,292,366
RETRIEVING AND REENTERING LONG MOLD SECTIONS
Filed June 17, 1939 7 Sheets-Sheet 4
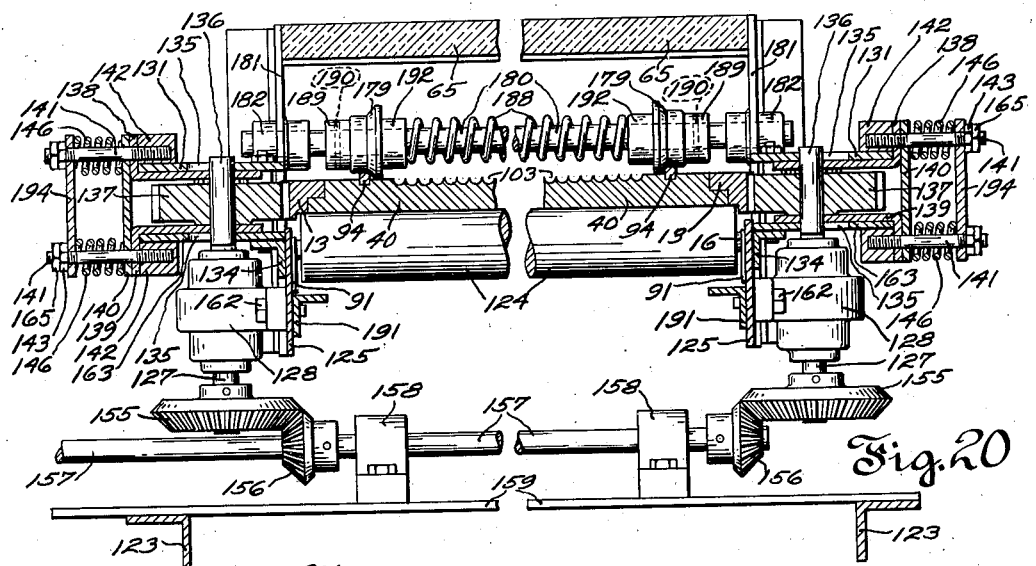
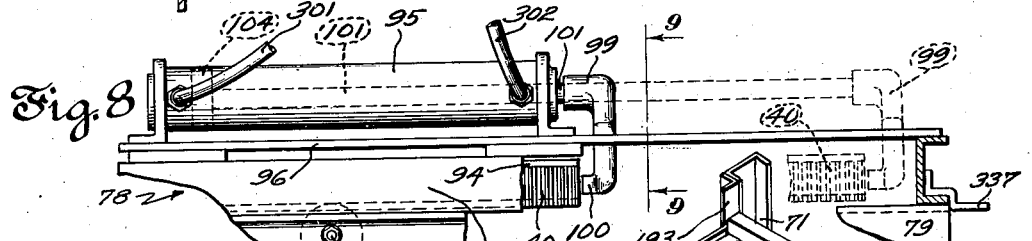
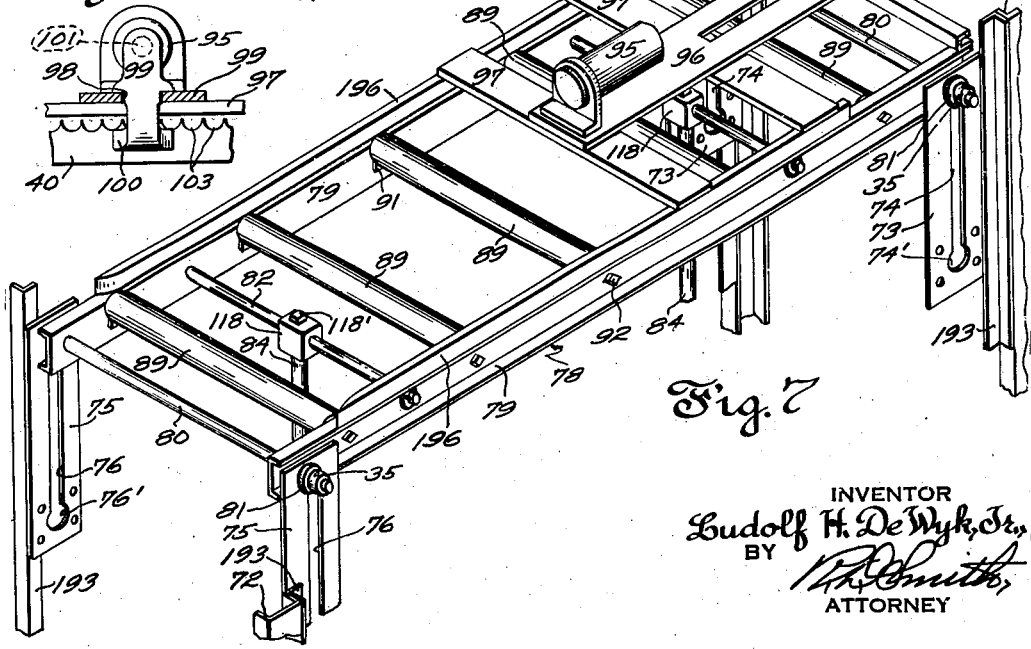
INVENTOR
Ludolf H. DeWyk, Jr.,
BY
ATTORNEY Aug. 11, 1942.    L. H. DE WYK, JR    2,292,366
RETRIEVING AND REENTERING LONG MOLD SECTIONS
Filed June 17, 1939    7 Sheets-Sheet 5
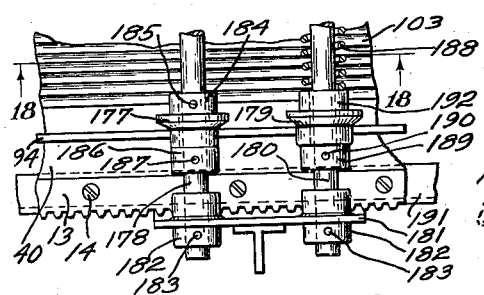
Fig. 16
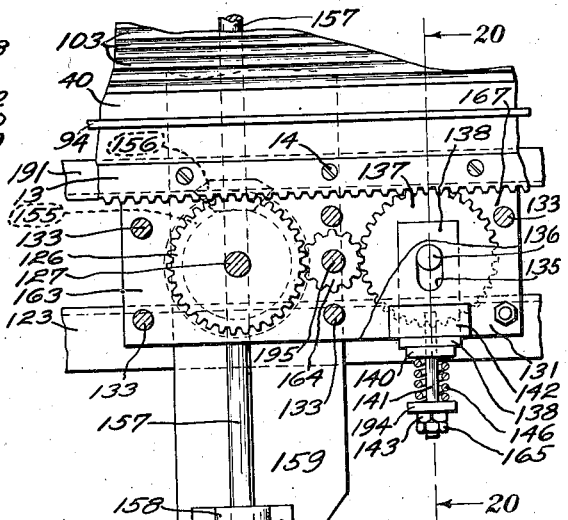
Fig. 15
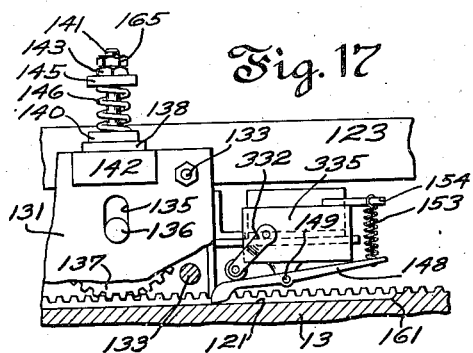
Fig. 17
Fig. 18
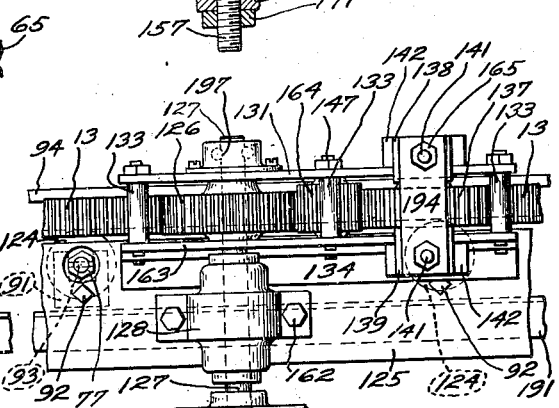
Fig. 19
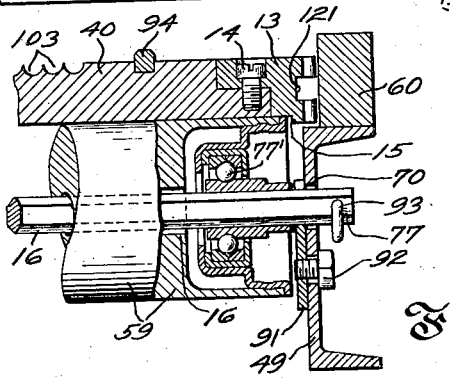
Fig. 14
INVENTOR
Rudolf H. DeWyk, Jr.
BY
ATTORNEY

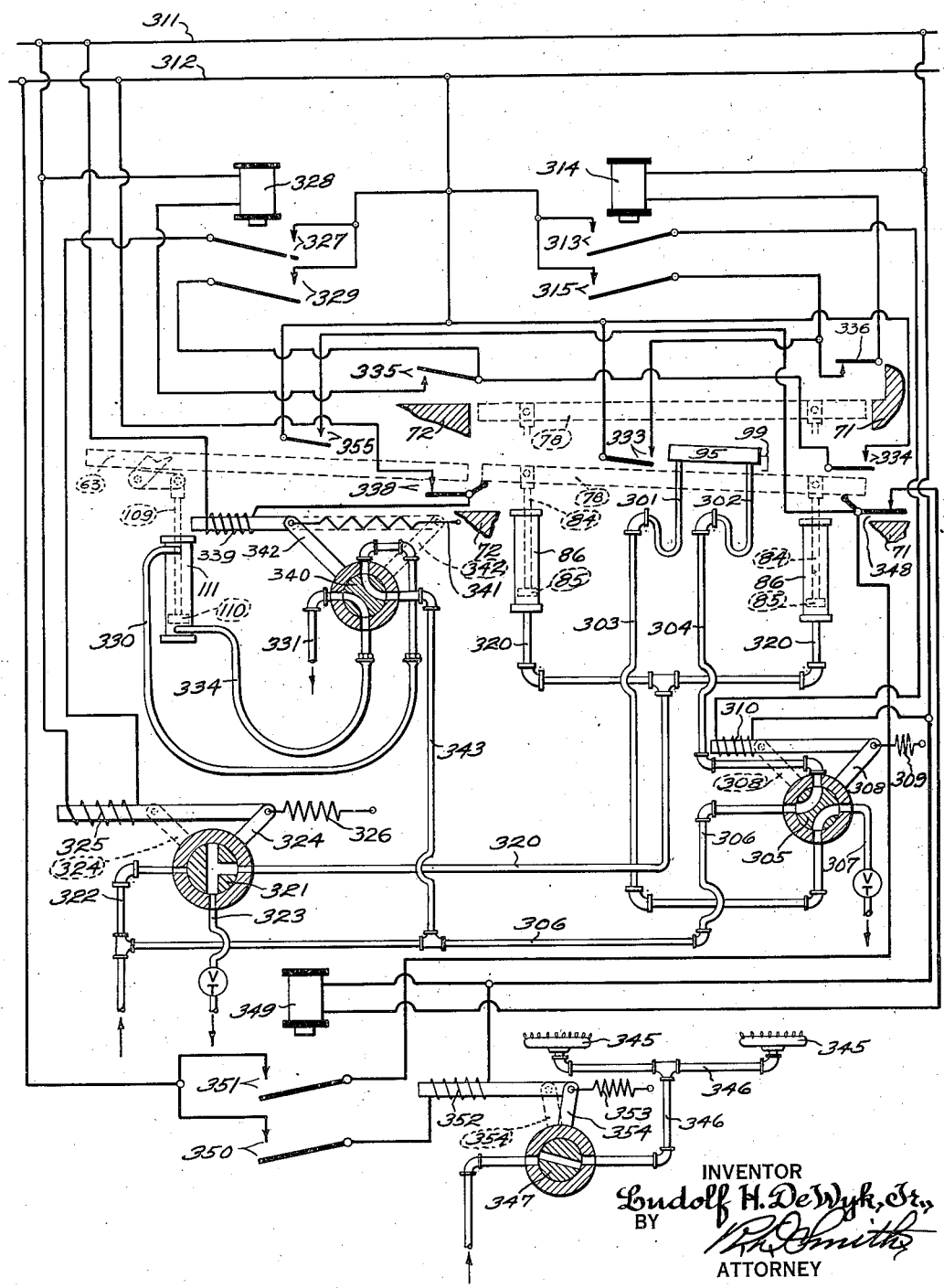

Patented Aug. 11, 1942

2,292,366

UNITED STATES PATENT OFFICE 2,292,366

RETRIEVING AND REENTERING LONG MOLD SECTIONS

Ludolf H. De Wyk, Jr., Ansonia, Conn., assignor to The Sponge Rubber Products Company, of Shelton, Conn., a corporation of Connecticut Application June 17, 1939, Serial No. 279,701

38 Claims. (Cl. 18—4)

This invention relates to methods and apparatus for successively removing mold sections from the work delivery end of a processing station continually traversed by a train of such sections, returning the removed sections one by one to the work intake end of the processing station, and then successively reentering the returned mold sections in the train while it is constantly traveling toward and through said station. Preferably this is done in a way to make operatively endless that part of the traveling train which occupies said processing station and to hold the mold sections of such part of the train always in end-to-end tight abutting contact without permitting gaps to occur therebetween.

One object of the invention is to practice the methods proposed in U. S. Patent No. 2,200,262 granted May 14, 1940, to Frederick M. Daley and Ludolf H. De Wyk, by the use of molds in the lower traveling train which are individually rigid and which are individually too long to permit their being carried round and round on a belt-like chain of pivotally connected links for conveying them from the exit of the processing station back to the entrance to the processing station.

Another object of the invention is to keep a slowly traveling train of rigid long mold sections endlessly replenished in the processing station by successively retrieving each mold section as it is slowly ejected from the work output end of said station and conditioning it for reentry at the work intake end of the station with speeds of movement so much greater than the travel of said train that only one or two mold sections need be employed additional to the number which fill the processing station.

Another object of the invention is progressively and uniformly to vulcanize during continual travel thereof a strip of sponge rubber having at least half of its girth absolutely free from marking by mold joints throughout continuous strip lengths of six feet or more.

A further object of the invention is to modify the machine disclosed in U. S. Patent No. 2,288,611, granted to Ludolf H. De Wyk, so that the upper articulated chain of pivotally connected mold sections may work cooperatively with a train of lower rigid mold sections each having a length too great to permit of said lower sections being carried over a circuitous route by means of pivotally connected links forming a carrier chain.

A further object of the invention is to insure an automatic supply of such long mold sections to a train thereof traveling continuously through a processing station in a manner to prevent gaps from occurring between mold sections of the train and in a manner to prevent the feeding of such unconnected mold sections to the train any faster than the progress of the train through the processing station calls for replenishment of such train.

A further object is to provide safeguards against automatic, untimely or premature return to the point of reentrance to said processing station of mold sections which have been discharged from the exit end of the processing station.

A further object is to insure the automatic closing up of each reentering mold section with respect to the trailing end of the train of mold sections which is constantly passing into the processing station in advance of same.

A further object is automatically to accomplish correct tilting of each mold section during different stages of its return travel from the exit end of the processing station to the point of entrance thereto, for the purpose of preparing the mold section for safe and smooth transfer from one part of the apparatus to an adjoining and operatively related part of the apparatus.

A further object of the invention is automatically to establish and maintain accurate lateral alignment of the newly entering mold section with respect to the mold section which precedes it in the train passing into and through the processing station.

A further object is to protect the mold sections and their automatic conveying and handling apparatus from impacts, shocks and strains resulting from setting in motion, arresting, and changing the direction of travel of mold sections possessing more than ordinary weight and momentum.

A still further object is to prevent detrimental loss of heat from the returning mold sections or from particular portions thereof which develop a greater readiness to lose heat, because such loss of heat would adversely affect the rate of production of a material such as sponge rubber being vulcanized in a processing machine embodying the present improvements.

The foregoing, as well as further and related objects will appear from the detailed description hereinafter in which description reference is had to the accompanying drawings, wherein:

Fig. 1 is a schematic view of a continuous process vulcanizing machine shown in side elevation and combined at each of its ends with sections of a complete apparatus for retrieving and reentering mold sections according to the present improvements, the course of travel of said mold sections being diagrammatically indicated by direction arrows.

Fig. 2 is an enlarged side elevation of the work receiving end of the vulcanizing machine and of the mold feeding apparatus joined thereto as at the right end of Fig. 1, the heat insulating jacket being mostly broken away and certain parts being shown in section on the plane 2—2 in Fig. 3 looking in the direction of the arrows.

Fig. 3 is a plan view looking down upon Fig. 1 with the heat insulating jacket removed from the mold section feeding apparatus and one mold section partially broken away to expose its underlying elevator platform.

Fig. 4 is a view taken in section through the elevating apparatus on the plane 4—4 in Fig. 2, looking in the direction of the arrows.

Fig. 5 is a lengthwise contracted side elevation of the work discharging end of the vulcanizing machine and of the mold take-off and retrieving apparatus joined thereto as at the left end of Fig. 1, parts being shown in section on the plane 5—5 of Fig. 6 looking in the direction of the arrows and shown on a larger scale than are the parts in Fig. 2.

Fig. 6 is a plan view looking downward upon Fig. 5 with the base partition of the heat insulating jacket broken away and the mold section and the roof of said jacket omitted, certain parts being shown as contracted in length.

Fig. 7 is an isometric view of the elevator platform and associated parts removed from the other apparatus of Figs. 2, 3, and 4.

Fig. 8 is an enlarged fragmentary view of the pneumatic plunger on the elevator platform, related parts being broken away or shown in section on plane 2—2 in Fig. 3.

Fig. 9 is a view taken in section on the plane 9—9 in Fig. 8 looking in the direction of the arrows.

Fig. 10 is a greatly enlarged fragmentary view of one guide spool for the elevator platform taken in section on the plane 10—10 in Fig. 5 looking in the direction of the arrows.

Fig. 11 is a fragmentary view of the lower adjustable stop for the guide spool of Fig. 10 shown on a correspondingly enlarged scale and taken in section on the plane 11—11 in Fig. 5, the parts arrested thereby appearing in broken lines.

Fig. 12 is a view looking from the section planes 12—12 in Fig. 11 in the direction of the arrows.

Fig. 13 is a fragmentary view taken in section on the plane 13—13 in Fig. 5 looking in the direction of the arrows and contracted in width.

Fig. 14 is a fragmentary view taken in section on the plane 14—14 in Fig. 5 looking in the direction of the arrows showing on a larger scale than in Fig. 13 a section of one edge portion of one mold section together with its underlying support roller.

Fig. 15 is a fragmentary enlarged plan view of one of the sets of gears appearing in Fig. 3 for receiving the mold sections from the elevator platform and feeding them toward the vulcanizing machine.

Fig. 16 is a correspondingly enlarged fragmentary plan view of one of the sets of flanged thrust wheels for aligning the mold sections laterally after they have passed the gears of Fig. 15.

Fig. 17 is a fragmentary plan view showing on a scale corresponding to Fig. 15 one of the limit switches appearing close to one of the said gear sets in Fig. 2 together with parts operatively associated therewith.

Fig. 18 is a view taken in section on the plane 18—18 in Fig. 16 looking in the direction of the arrows.

Fig. 19 is a view looking in the direction of the arrows from section plane 19—19 in Fig. 15.

Fig. 20 is a view taken in section on the plane 20—20 in Fig. 3 showing the parts on the same scale as in Figs. 15 and 16, certain parts being contracted in length.

Fig. 21 is a diagram of the electrical and pneumatic system by which the mold section take-off and retrieving apparatus of Figs. 5 and 6 is automatically controlled and operated.

Fig. 22 is a diagram of the electrical and pneumatic system by which the mold section elevating and reentering apparatus of Figs. 2, 3, and 4 is automatically controlled and operated.

*Continuous process vulcanizing machine*

Figure 23:
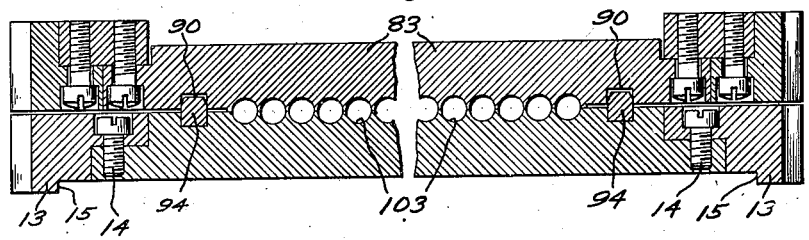
Fig. 23 is a contracted view on a much enlarged scale taken through the upper mold sections of the endless chain and the lower mold plates mating therewith on the plane 23—23 in Fig. 5.
Figure 24:
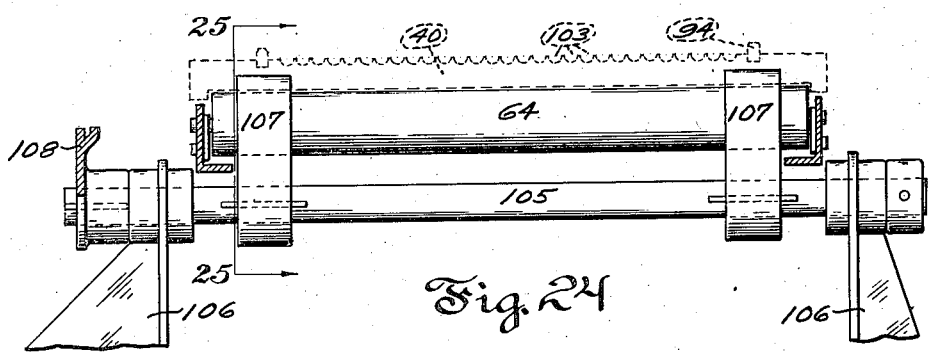
Fig. 24 is an enlarged fragmentary view taken on the plane 24—24 in Fig. 2 showing the safety stop mechanism.

With but relatively minor changes the processing, or continuous process vulcanizing machine, making use of the mold section retrieving and reentering apparatus of these improvements may be like that disclosed in the U. S. Patent No. 2,288,611, granted to Ludolf H. De Wyk, the same being a machine adapted to vulcanize sponge rubber strips uniformly in unlimited lengths as a continuous process. End portions of a like or equivalent vulcanizing machine are shown in the drawings hereof to illustrate the manner in which the formerly employed lower train of pivotally connected narrow mold sections may according to the present improvements be replaced by very long rigid unconnected mold plates, themselves unsuited to being pivotally interconnected as, or by, links of an endless form of chain as a means of returning them to a position to reenter the processing machine.

That much of the structure of the vulcanizing machine which remains in the form shown in said co-pending application is designated herein by like reference characters thereby to facilitate identifying and comparing the parts of the present machine with those of the earlier application. Among these are legs 10, 10 supporting the lower horizontally extending frame beams 11, 12 and the upper horizontally extending frame beams 17 and 18 of the vulcanizing machine. The horizontal shaft 19 carries spaced wheels 20 and 22 and is journaled in bearing housings 23 and 24 supported respectively on the upper frame beams 17 and 18 at the work receiving end of the vulcanizing machine.

In Fig. 5 a similar shaft 29 carries two wheels such as 30 axially spaced similarly to wheels 20 and 22, and is journaled in bearing housings 34 supported respectively on the upper frame beams 17 and 18 similarly to housings 23 and 24 at the work discharging end of the vulcanizing machine.

An endless chain of mold sections 83 is movably supported in the manner of an endless belt by wheels 20, 22, 30 and 32 so that the lower stretch of this chain may travel endlessly through the heat zone of the vulcanizing machine whose length occupies the central stretch 38 of the structure represented in Fig. 1. The construction of this chain of upper mold sections 83 may be as is fully illustrated and described in the aforesaid Patent No. 2,288,611. Likewise there is carried by the lower frame beam 11 a series of freely turnable track rollers 102 which will be understood to extend the full length of the processing station or heat zone of the vulcanizing machine 38 in a manner to form a support track for the elongated slab-like form of mold sections or plates 40 newly comprising the train of work carrying lower mold sections of these improvements.

The present invention is in large part concerned with ways and means of retrieving such elongated mold plates or sections one by one as they pass out of the work discharging end of the machine, and of reentering them successively as restored members of the continuous train of plates continually traveling into and through the vulcanizing machine. The apparatus for so retrieving and reentering the new mold plates is divided into two main groups of parts, one of which indicated as a whole by 37 in Fig. 1, is joined to the work discharging end of the vulcanizing machine and the other of which, indicated as a whole by 39 in Fig. 1, is joined to the work intake end of the vulcanizing machine.

In general the purpose and function of the mold take-off and retrieving apparatus 37 and of the mold elevating and feed-in apparatus 39 will be plain from the schematic view of the vulcanizing machine 38 combined with such apparatus as shown in Fig. 1. Here one of the elongated mold plates 40 is shown in broken lines as occupying different positions in its circuitous course of travel from the entrance of the processing station to the exit therefrom and back again to the entrance as indicated by the arrows D. In this route of travel the mold plate is neither turned end for end nor bottom side up as is the case with the articulated chain of lower mold sections in the aforesaid co-pending application. The present mold sections or plates 40 which comprise the lower train are rigid and much too long in the direction of their travel to permit of their being carried around any pulley device in the manner of an endless chain of interconnected links. The present apparatus has therefore been devised for retrieving and reentering such long rigid mold plates so that an unbroken train of them may, without manual attendance, always be traveling in a continuous procession through the processing station in face-to-face contact and in unison with the mold sections 83 of the upper articulated chain, and while themselves unconnected in any manner.

An impelling force for the mold sections at the work entering end of the vulcanizing machine (Figs. 2 and 3) and a retarding force for the mold sections at the work discharging end of the vulcanizing machine (Fig. 5) are applied by mechanisms generally similar to those utilized in the said Patent No. 2,288,611. The power of an electric motor, shown in said co-pending application, is transmitted to power wheel 132 which turns horizontal shaft 129 which turns bevel gear 130 which turns bevel gear 122 and thereby vertical shafts 117 at equal speeds at each side of the machine. Spur gears 115, respectively fixed on said shafts, impel constantly toward the left in Figs. 2 and 3, the entire train of mold plates 40 which are passing through the heat zone of the vulcanizing machine, by turning in mesh with a continuous rack 13 of gear teeth fixed along the edges of said plates as hereinafter more fully to be described. In Fig. 2 the chain of short pivotally interconnected upper mold sections 83 is seen to be impelled in a corresponding manner by means of an additional spur gear 144 which in the form of the power drive herein illustrated is not in mesh with the rack teeth of the train of lower mold sections or plates 40 but only with the rack teeth of the chain of upper mold sections 83. A power transmission capable of slippage is provided between gear 115 and gear 144 in the form of a belt 150 by means of which a pulley 151 fast to gear 115 drives a pulley 152 of like diameter fast to gear 144. The shafts of gears 115 and 144 are each journaled in the stationary frame of the vulcanizing machine at each side of the procession of mold sections moving thereinto. Gears 115 and 144 will ordinarily impel mold sections 40 and 83 at like speeds and in unison through the machine. Under some circumstances gear 144 may be omitted and the movement of mold plates 40 will carry mold sections 83 with them.

The retarding gears 147 and 145 are in mesh with the rack teeth on each side of mold sections 40 and 83 respectively at the work discharging end of the machine and subject to individual braking action as fully disclosed in the said Patent No. 2,288,611, for the purpose of holding pressed together the adjoining ends of mold plates 40, 40 etc. and mold sections 83, 83, etc. as they travel through the vulcanizing machine.

*Take-off and retrieving apparatus*

The take-off portion of this apparatus operates within a skeleton framework joined to the work discharging end of the vulcanizing machine. This framework includes channel iron posts 41 and 42, there being two of the posts 41 each carrying fixed thereon a vertical guide plate 43 containing an elbow-shaped slot 44, and there being two of the posts 42 each carrying a guide plate 45 containing an elbow shaped slot 46. The posts 41 and 42, together with as many intermediate posts as may be needed, are braced in relation to one another by suitable connecting irons and trusses not necessary here to be shown in detail but serving the purpose of making the said skeleton framework self-rigid and fast to the vulcanizing machine so that this framework may stand independently on the floor 47 of the room in which the vulcanizing machine is located. Preferably some room or basement is accessible therebelow.

A take-off platform 48 whose construction is best shown in Figs. 5 and 6 may descend and ascend in a veering path of movement determined by the slots 44 and 46 and is comprised of side irons 49 rigidly connected by cross rods 50 on each of whose ends, outwardly of the side irons, is rotatably carried a guide spool 51 so that a similar guide spool is located at each of the four corners of the open platform 48 and rides in one of the slots 44 or 46. An enlargement 44' or 46' at the bottom end of each of said slots permits assembly of guide spool 51 into working engagement therewith. Each of rods 50 has secured to each extreme end thereof by a pin 36 a thrust collar 35 as shown in Fig. 10. The barrel of the guide spool 51 is axially long enough to accommodate not only the thickness of the guide plate 45 but also a stop plate 68 secured to the latter by bolts such as 69. If the bolts 69 are accommodated in vertically elongated slots in stop plate 68 and have threaded engagement with guide plate 45, the stop plate can be assembled on the guide plate in a vertically adjustable manner and conveniently adjusted after assemblage for varying the top limit of travel of the guide roller and consequently of each corresponding corner of the take-off platform.

The bottom limit of travel of each guide roller and corresponding corner of the take-off platform is adjustable by means of the parts shown in Figs. 11 and 12 wherein lower angle piece 25 is secured in fixed position on guide plate 68 by bolts 26. Upper angle piece 27, however, has vertically elongated slots 28 accommodating shanks of the bolts 31 which have threaded engagement with the guide plate 45. When bolts 31 are loosened the adjustor bolt 21 may be turned in the flange of angle piece 25 with which it has threaded engagement thereby to bear upwardly or let down on angle piece 27.

Also spanning the space between side irons 49 and retained in bearings 66 thereon by cotter pins 67 are two additional cross rods 52 each of which is assembled rigidly with the joint block 53 of a piston stem 54 whose piston head 55 slides vertically lengthwise within a hollow pneumatic cylinder 56. At its bottom end each of cylinders 56 is swingably mounted on a stationary pivot 57 supported at the top of a floor standard 58. Each piston stem 54 has full size tight engagement near its upper end with a bore in block 53 and further has a terminal 54' of reduced diameter which passes through and has a tight fit with both the cross rod 52 and the upper portion of the block 53 being threaded above the latter to take the nut 118'.

For receiving the long rigid mold plate 40 as the latter is slowly discharged endwise from the vulcanizing machine 38, a series of freely turnable rollers 59 spans the space between side irons 49 of the drop platform and are journaled therein as best shown in Fig. 14.

The cross-sectional shape of the mold sections or plates is, in certain edge portions thereof, as shown in Fig. 14. Gear-toothed rack bars 13 are secured by bolts 14 in overlapping relation to each edge portion of the mold plate, each such rack bar having the downwardly directed longitudinally extending shoulder 15 riding alongside the ends of rollers 59 thereby enabling the ends of the rollers to guide and restrain the mold plates laterally as they pass along any track composed of such rollers. Each marginal side of the mold plate carries a key 94. Between keys 94 are located the work carrying cavities for the material to be processed or vulcanized, such cavities in the present example comprising side-by-side grooves 103. Each of the racks 13, keys 94, and grooves 103 is coextensive with the length of the mold plate 40.

The rollers, themselves, may be hollow or solid and may have the hexagonal core shaft 16 extending loosely through a clearance bore lengthwise of the roller and projecting from each end of the roller. An oversize aperture 70 permits the core shaft loosely to penetrate the side iron 49 of the take-off platform and the hexagonal cross sectional shape of said shaft interlocks rotatively in a correspondingly notched upper edge of a bearing plate 91 secured to the inner surface of side iron 49 by bolts 92. A ring 93 passing through and hanging from each end of the shaft serves as an endwise retainer for the shaft and provides means for pulling the shaft endwise through the frame and out of the roller, this being permitted because the inner races of ball bearings 77' have a freely sliding fit on the shaft while rotatively interlocked therewith by means of the hexagon shape. The core shaft 16 is kept from rotating by bearing plate 91 but may be vertically adjusted therewith since vertically elongated holes are provided for bolts 92 in side iron 49 and aperture 70 is larger than the hexagonal sleeve 77. This is useful for correcting planar alignment of the rollers.

Each end of shaft 77 carries the inner race of the radial and thrust type ball bearing 77' occupying each hollow end of each roller, and whose outer race turns fixedly with the roller. Thus every roller turns with the utmost ease and freedom from friction and all bearing duty is taken by the balls, while the core shaft and its hexagonal sleeve remain stationary with the frame parts by which they are supported. Each of the side irons 49 also carries fixedly on its top a guard rail 60 to provide more accurate lateral positioning of the mold plate than the roller ends alone can be depended upon to insure.

In horizontal alignment with the upper or elevated position of take-off platform 48, stationary parallel side bars 61 are fast to and extend from frame beams 11, 12 of the vulcanizing machine and serve to support bearings for the freely turnable rollers 62 which may be mounted therebetween according to the construction shown in Fig. 14, thus forming a continuation of the antifrictional track for the mold plates 40, which track within the vulcanizing machine itself is afforded by the rollers 102. On a lower level, and extending the entire length of the vulcanizing machine at a suitably slight incline to the horizontal, are auxiliary parallel bars 63 at each side of the machine carrying therebetween the freely turnable rollers 64 also mounted according to the bearing structure shown in Fig. 14, thus forming a down-hill antifrictional track on which the mold plates 40 may coast along the entire length of the vulcanizing machine in a return route from the work discharging end of the processing station in the vulcanizing machine back to the work receiving end thereof. All of the structure and apparatus represented in Fig. 1 is preferably encased by a heat retaining jacket 65 of suitable refractory and insulative character to prevent loss of heat from the mold plates 40 as fully as possible while the latter are traveling over the return course above described.

The foregoing sets forth the structural features of the mold retrieving apparatus. Its intermittent and repeated operation in properly timed relation to the progress of the mold sections that are constantly traveling through the vulcanizing machine is effected and controlled by additional agencies well known as to nature and therefore not necessary to be described as to structure. These agencies are fully represented in the electro-pneumatic diagram of Fig. 21.

*Operation of take-off and retrieving apparatus*

Referring most particularly to diagrammatic Fig. 21, two positions of the take-off platform 48 are indicated in broken lines. Therebelow the pneumatic cylinders 56 are shown in light full lines together with air conduits 201 and 202 which will be comprised of flexible hose or the like because they connect respectively to the lower ends of the swingable cylinders 56. Conduits 201 and 202 join and are connected by a common pipe line 203 to the electromagnetically operated valve 204.

A second pipe 205 leads to valve 204 from a constant supply of compressed air (not shown) while a third pipe 206 leads from valve 204 through an adjustable throttling device VT to any exhaust outlet or place of atmospheric pressure. Valve operating arm 207 is shown in full lines as positioning the valve ports to pass compressed air from pipe 205 to pipe 203 and thus to inject pressure fluid beneath the pistons in cylinders 56 to cause them to hold the platform 48 elevated in its uppermost horizontal position. Valve arm 207 is held in this position by the electrically energized solenoid coil 208 which overcomes the tension in spring 209 tending to pull valve arm 207 to its broken line position. Coil 208 is energized by electric current supplied from conductor mains 210 and 211 through one pair of self-opening contacts 212 of a remote control switch or relay, whose solenoid 213 when electrically energized closes said contacts 212. Heavy single lines in Fig. 21 represent electrical conductors completing the above mentioned circuit connections for the valve coil 208 and also conductors for other circuit connections governing electrical energization of the relay solenoid 213, itself, as follows. The relay includes a second pair of self-opening contacts 214 closable in unison with contacts 212 by the relay solenoid 213 when the latter is energized. Relay contacts 214 are electrically connected in series with the normally closed contacts of a limit switch 215 (see Fig. 5) mounted on platform 48 and wired by trailing conductors, and with the coil of relay solenoid 213 itself. Relay contacts 214 are further electrically connected in parallel relation with the normally open contacts of a second limit switch 216 (see Fig. 1 for location of this limit switch in the apparatus). The circuit will be seen to be such that the contacts of limit switches 215 and 216 are in series with each other and with the solenoid 213 of the relay so that the following cycle of operation of the take-off apparatus is initiated, carried through, and terminated automatically in response to the movements of the mold section or plate as it is ejected from the discharge end of the vulcanizing machine onto the take-off platform 48.

The limit switches herein employed are illustrative of any form of electric current controlling device which will be operatively sensitive to the arrival and departure of the mold sections one at a time in relation to predetermined stations or locations in the apparatus. Thus a so-called electric eye, or photo electric current governing cell or other well known devices for equivalent purposes might be employed in their stead. Each limit switch as used herein may comprise a case containing the circuit controlling contacts and an exterior swingable contact actuating arm such as 217. The free end of this arm is normally positioned by a spring, or otherwise, to occupy the path of travel of the mold section or plate and to be swung out of such path by engagement of some suitable part of the mold section in passing.

Thus when the left or leading edge of mold plate 40 reaches its position shown in Fig. 5 after emerging from the vulcanizing machine, the limit switch 215 which is mounted on the take-off platform 48 is actuated thereby and its contacts opened. Before this has happened, both relay contacts 212 and 214 were held closed by the energized solenoid 213. Now, however, solenoid 213 becomes deenergized and contacts 212 and 214 open, thus deenergizing valve coil 208 which permits spring 209 to throw the valve arm 207 to its broken line position and rotate the valve parts a quarter turn clockwise. This cuts off the supply of pressure fluid from pipe 205 to the cylinders 56 and exhausts from these cylinders through the pipe 206 such pressure fluid as they contain, the rate of fluid exhaust being checked to any desired degree by adjustment of throttling valve VT.

Platform 48 will now descend under its own weight (combined with that of the mold plate) first veering to the left as occasioned by slots 44 and 46 and correspondingly separating the mold plate 40 endwise from the like mold plate that is following it and still emerging from the vulcanizing machine. Descent of the platform will be retarded to the extent of the time required for the pressure fluid to leave the cylinders and is finally arrested by angle pieces 27 in an inclined position as indicated in broken lines in Figs. 5 and 21. In this descent of its take-off platform the left end in Fig. 5, which is most remote from the vulcanizing machine, will begin and complete its descent before the right end respectively begins and completes its descent because of the manner in which the cylinders 56, 56 are spaced from left to right in relation to the center of gravity of the take-off platform. It is obvious from inspection of Fig. 5 that the cylinder at the left is subjected to a preponderance of the total weight and therefore the piston in this cylinder having only the same force of fluid pressure supporting it as has the piston in the other cylinder, will yield more readily and effect the tilting referred to. This insures that the mold plate 40 will not coast toward the right and off from the descending platform rollers 59 before the left end of the platform has reached its lowest position. After this has happened however, the right end of the platform continues to descend until eventually its direction of tilting is reversed because the stop pieces 27 are so arranged. This serves to dump the mold plate off the platform and start it coasting along the rollers 64 of the inclined return track.

The left end of the mold plate now leaves engagement with limit switch 215 and the contacts of the latter automatically close again. This, however, does not immediately cause the relay solenoid 213 to again become energized because the latter remains cut off from the current main 211 at the open relay contacts 214 and also at the normally open contacts of limit switch 216. Hence the relay contacts 212 continue to remain open and no change in the condition of the pneumatic system through valve 204 at this time occurs. Only after the entire length of the mold plate has coasted off from the platform 48 can the limit switch 216 be reached and actuated by the self-returning mold plate. When this occurs the normally open contacts in limit switch 216 become closed (temporarily during the passing of the coasting mold plate) and this completes the connection of relay solenoid 213 to the current main 211, limit switch 215 having formerly become closed as stated. The consequent energizing of relay solenoid 213 restores all electrical and pneumatic agencies to their condition shown in the diagram of Fig. 21 whereupon pressure fluid will reenter the cylinder 56 and lift the platform 48 to its uppermost position, empty and ready to receive the next mold plate which during the downward excursion of the platform has continued slowly to emerge from the vulcanizing machine. When the mold plate which the platform 48 has last dumped onto the rollers 64 has completely passed limit switch 216 the latter is left normally open ready to repeat its participation in the cycle of take-off and retrieving operation which has now been fully described.

In case of failure of the platform 48 to descend promptly and carry the mold section 40 with which it is loaded downward and out of the path of the oncoming following mold plate, additional safety limit switch 218 may be provided which will be engaged and operated by the traveling mold plate and which is electrically connected in a manner to shut off the power which is impelling the mold sections through and out of the vulcanizing machine, in other words the power which drives wheel 132 in Figs. 2 and 3 such as the power of the electric motor shown in the said co-pending application, Serial No. 111,769. It is obvious from the position of switch 218 in Fig. 5, which switch may be supported by the post 41, that if the platform 48 descends at its designed predetermined time, the mold plate will not have traveled far enough endwise therealong to ever reach this emergency limit switch 218 before the mold plate is carried downwardly with the platform.

*Elevating and safety apparatus*

Similarly to the retrieving apparatus, the elevating apparatus operates with a skeleton framework joined to the opposite, or work receiving, end of the vulcanizing machine. Such framework includes channel posts 71 and 72, there being two of the posts 41 each supporting rigidly by means of angle irons 193 a vertical guide plate 73 containing the elongated vertical slot 74 enlarged at 74' and there being two of the posts 72 each carrying a guide plate 75 containing an elongated slot 76 enlarged at 76'. The tops and bottoms of slots 74 and 76 are equipped with adjustable stop pieces such as shown in Figs. 10, 11 and 12. The posts 71 and 72 together with any additional posts that may be needed, are braced in relation to one another by suitable connecting irons and trusses not necessary here to be shown in detail but serving the purpose of making the skeleton framework self rigid and fast to the vulcanizing machine so that this framework may stand independently on the floor 47.

An elevator platform indicated as a whole by 78, and whose construction is best shown in Figs. 2, 3, and 7, is movable up and down in a path determined by slots 74 and 76 and includes side irons 79 rigidly connected by cross rods 80. On the end of each of rods 80 outside the side irons 79 is rotatably carried a guide spool 51, one such spool being thus located at each of the four corners of the elevator platform 78 and riding lengthwise of one of the slots 74 and 76. In its lowest inclined position shown in broken lines in Fig. 2, platform 78 aligns with and is tilted to accord with the inclined track of rollers 64. In its uppermost position shown in full lines the platform is horizontal. These bottom and top extreme positions for the platform may be determined by stop pieces mounted on guide plates 73 and 75 according to the constructions shown in Figs. 10, 11 and 12 and hence are not specifically illustrated in Figs. 2 and 7.

Also spanning the space between side irons 79 are two additional cross rods 82 each of which is made fast to the joint block 118 of a piston stem 84 with the help of a nut 118' locking an assembly of the parts like that shown in Fig. 13. A piston head 85 connected to stem 84 slides vertically lengthwise within each of the two pneumatic cylinder casings 86, 86. At its bottom end each of the cylinders 86 is mounted on a hanger plate 87 clamped to the under surface of floor 47 by bolts 88. This form of support for cylinder 86 develops in practice to provide all necessary "give" or sway of the piston rods 84 laterally and relative to each other to accommodate the minute change in horizontal spacing of pivot rods 82, 82 that results from tilting of the side irons 79.

For receiving one of the long rigid mold plates 40 as the latter coasts endwise off from the rollers 64 of the inclined return track, a series of rollers 89 turning upon ball bearings spans the space between side irons 79 of the elevator platform and such rollers are mounted in each of the latter by structure according with Fig. 14. Each of these side irons also carries fixed thereto and extending along its top a guard rail 196 serving a purpose similar to that of guard rails 60 in Fig. 5.

In the case of the elevator platform 78 these guard rails also serve to support pneumatic cylinder 95 mounted above the level of the mold plate 40 on a foot plate 96 which in turn is mounted on cross bars 97 rigid with the guard rails 196. Plate 96 contains a slot 98 opening through one end. A plunger head 99 is free to slide lengthwise in this slot and presents its lower impeller end 100 in the path of travel of the leading end of the mold plate when the later has coasted a sufficient distance onto platform 78 supported by rollers 89. Plunger head 99 is rigid with a piston stem 101 whose piston head 104 reciprocates lengthwise in the horizontal cylinder 95.

As safety mechanism to prevent coasting of a mold plate off from the track of rollers 64 when the elevator platform is not in position to receive it, there is supported in fixed relation to the auxiliary beam 63 in Figs. 2 and 3 a shaft 105 journaled in laterally spaced floor standards 106. Shaft 105 carries fixedly thereon between said floor standards two laterally spaced safety blocking or stop arms 107 whose top ends are capable of being swung upwardly in unison into the path of travel of the mold plate as the latter coasts down the inclined track on rollers 64. Also fixed to shaft 105 is a crank arm 108 to whose free end is pivoted the top of a piston stem 109 whose piston head 110 is vertically slidable in the pneumatic cylinder casing 111 supported to swing on the pivot 112 rigidly carried on the hanger plate 113 which is clamped to the under surface of floor 47 by bolts 114. One flexible hose 330 communicates with the interior of cylinder 111 always above piston head 104 while flexible hose 344 communicates with the interior of this cylinder always below said piston head.

The foregoing describes the structural features of the mold plate elevating and safety apparatus. Its intermittent and repeated operation in properly timed relation to the progress of the mold sections constantly traveling through the vulcanizing machine is effected and controlled by additional agencies well known as to nature and therefore not necessary to be described as to structure. These agencies are fully represented in the electro-pneumatic diagram of Fig. 22.

Operation of the elevating and safety apparatus

Referring most particularly to diagrammatic Fig. 22, two positions of the elevator platform 78 are indicated in broken lines. Therebelow the pneumatic lift cylinders are indicated at 86 while the pneumatic plunger cylinder is indicated at 95 carried on, as well as up and down with, the platform 78. Air conduits 301 and 302 will consequently comprise flexible hose or the like so that one end of each conduit may travel freely with cylinder 95 while the other ends communicate with the respective stationary pipe lines 303 and 304. Each of pipes 303 and 304 leads to the electromagnetically operated valve 305. A third pipe 306 leads to valve 305 from a constant supply of compressed air (not shown) while a fourth pipe 307 leads from valve 305 through an adjustable throttling device VT to any exhaust outlet or place of atmospheric pressure. Hose 301 connects to the cylinder in a manner always to communicate with the interior thereof always at the left side of piston 104 while hose 302 communicates with the cylinder interior always at the right side of piston 104. Valve operating arm 308 is shown in full lines as positioning the valve ports to pass compressed air from supply pipe 306 to pipe 304 and hence through flexible conduit 302 to the right side of the piston in cylinder 95 thereby to hold the plunger head 99 projecting a minimum distance from the right end of cylinder 95. Valve arm 308 is held in this position by the spring 309 which may be overcome by the pull of solenoid coil 310 toward the left to its broken line position when the latter is electrically energized. Coil 310 is energized by electric current supplied from conductor mains 311 and 312 through one pair of self-opening contacts 313 of a remote control switch or relay whose solenoid 314 when electrically energized, closes said contacts 313. Heavy single lines in Fig. 22 represent electrical conductors completing the above mentioned circuit connection for valve coil 310, and also other circuit connections for governing electrical energization of the relay solenoid 314, itself, as later to be described. This relay includes a second pair of self opening contacts 315 which are closable in unison with contacts 313 by the relay solenoid 314 when the latter is energized.

The pneumatic cylinders 86 are provided with joint pipe connection 320 leading to their respective bottom ends from the electromagnetically operated valve 321. A second pipe 322 leads to valve 321 from a constant supply of compressed air (not shown) while a third pipe 323 leads from valve 321 through an adjustable throttling device YT to any exhaust outlet or place of atmospheric pressure. Valve operating arm 324 is shown in full lines as positioning the ports of valve 321 to pass compressed air from pipe 320 to pipe 323 and thus to exhaust pressure fluid from beneath the pistons in cylinders 85 to permit the platform 78 to drop to its lowermost tilted position. Valve arm 324 is held in this position by the spring 326 which may be overcome by the pull of solenoid coil 325 toward the left to its broken line position when this coil is electrically energized. Coil 325 is energized by electric current which may be supplied from the conductor mains 311 and 312 through one pair of self-opening contacts 327 of a remote control switch or relay whose solenoid 328 when electrically energized closes said contacts 327. Other circuit connections govern electrical energization of the relay solenoid 328, itself, as hereinafter to be described. This relay includes a second pair of self-opening contacts 329 closable in unison with contacts 327 by the relay solenoid 328 when the latter is energized.

In conjunction with the relays and their contacts which have been described, four limit switches are mounted at various points on moving or stationary parts of the apparatus each of whose location is shown in Figs. 2 and 3 and is diagrammatically indicated in Fig. 22. Limit switch 333 has self opening contacts and determines when the plunger head 99 shall move to the right and is mounted on the top of one of the platform carried guard rails 90 approximately midway the length of the platform 78, and its actuating arm falls in the path of travel of the edge of mold plate 40 as the plate coasts onto the platform. Limit switch 334 has self opening contacts and determines when the platform shall start to rise and is likewise mounted on the top of one of the platform carried guard rails 90 but near the end of the platform remote from the vulcanizing machine. Limit switch 335 has self closing contacts and insures that platform 78 can not begin to rise when switch 334 is closed unless and until the last mold plate 40 which was discharged from the platform has sufficiently progressed away from the path of a subsequently rising mold plate to prevent interference therebetween. This switch 335 is supported from one of the frame posts 72 and its actuating arm 332 is operatively associated with a passing mold plate 40 in a special manner best shown in Fig. 17 hereinafter more particularly described. Limit switch 336 has self closing contacts and serves to initiate the departure of the mold plate from platform 78 by causing the plunger head 99 to act when the platform has reached its uppermost position. This limit switch 336 is supported from the posts 71 and its actuating arm falls in the path of a projection 337 carried by the platform. Limit switch 338 has self opening contacts and serves to determine when the path of coasting travel of returning mold plates 40 shall be blocked and cleared at a point to prevent a mold plate from coasting toward the elevator platform 78 when the latter is not in position to receive it. This switch is supported from frame post 72 and its actuating arm falls in the path of downward movement of the left end of elevator platform 78 or of some suitable projection carried thereby.

The automatically repeated cycles of mold plate elevating and discharging action are effected by the electropneumatic system of Fig. 22 in the following manner.

When approximately half the length of a mold plate has coasted toward the right off from the inclined track of rollers 64 and onto the rollers 89 of elevator platform 78, its leading edge first contacts limit switch 333 closing the same. As limit switch 336 is normally closed at this time, because undisturbed by the projection 337 on the lowered platform, the relay solenoid 314 becomes energized from the mains 311 and 312 through closed limit switches 333 and 336 which are in series relationship. Solenoid 314 thereupon closes both pairs of relay contacts 313 and 315 and the magnet coil 310 becomes energized through contacts 313 and swings valve arm 308 toward the left rotating the ports of valve 305 a quarter turn counterclockwise, whereupon pressure fluid passes from supply pipe 306 through pipe 303 and conduit 301 to the left side of the piston head 104 in cylinder 95 and the pressure fluid is exhausted from the right side of piston head 104 through conduit 302, pipe 304 and pipe 307 with a rapidity determined by the adjustive setting of the throttling valve VT. The plunger head 99 is thus conditioned by the action of the fluid pressure to act as a buffer to slow up the speed of the heavy arriving mold plate and check its momentum without shock to the mechanical parts. When the plunger head, followed by the arriving mold plate, has moved out as far as it will reach from the right end of the cylinder 95 the mold plate will have come to rest, and the arrival of its leading edge at the position of limit switch 334 will have closed the contacts of the latter. This will produce no immediate active effect in the system unless and until the contacts of limit switch 335 shall also have become closed, which is permitted only when the trailing end of the next preceding mold plate has passed limit switch 335 in its travel toward the left on its way to the vulcanizing machine and thus has cleared the path for the succeeding mold plate now to be elevated. Now, when limit switch 335 also becomes closed the relay solenoid 328 will become energized from the mains 311 and 312 thereupon closing both pairs of relay contacts 327 and 329. The magnet coil 325 is electrically energized through relay contacts 327 and swings valve arm 324 toward the left rotating the ports of valve 321 a quarter turn counterclockwise whereupon pressure fluid passes from supply pipe 322 through pipe line 326 into the bottom of both cylinders 86 and acts upwardly on the piston heads 85 to lift the elevator platform 78.

During this lifting action the right end of the elevator platform, which is most remote from the vulcanizing machine in Figs. 2 and 22, will remain lower than the left end with the result that the left end arrives at its topmost position first and is arrested there while the originally lower right end completes a sufficiently greater upward travel to bring the platform into a horizontal plane. This insures that the mold plate will have no tendency while being lifted to coast off from the platform toward the left. It is held from coasting toward the right by means of the plunger head 99. It will be noted that the piston joint blocks 118 are so spaced longitudinally of the platform 78 that the center of gravity of the latter is nearest the bearing block that is most remote from the vulcanizing machine. This, coupled with the greater vertical length of the guide slots 74 and the greater vertical travel of piston bearing block 118 nearest thereto, accomplishes the described changes in the tilted condition of the platform for the purposes explained. While not appearing in Figs. 2 and 7, the adjustable stop means shown in Figs. 10 and 11 are applied to the top and bottom, respectively, of each slot 74 and 76 on guide plates 73 and 75 to predetermine separately adjustable limits of both up and down movement for each corner of the elevator platform 78.

Upon arrival of the originally lower end of platform 78 at its uppermost position, the projection 337 carried by the platform engages and throws the actuating arm of limit switch 336 thereby opening its normally closed contacts. Relay solenoid 314 is immediately deenergized and permits both pairs of contacts 313 and 315 to open in unison. This deprives magnet coil 310 of current and permits spring 309 to restore arm 308 to its full line position shown in Fig. 22. The ports of valve 305 are thus rotated a quarter turn clockwise and restore the pipe communications shown in Fig. 22 whence fluid pressure is transferred from the left side to the right side of piston head 104 in cylinder 95. This causes plunger head to move toward the left in Figs. 2 and 8 shoving before it the mold plate 40 whose departure from the elevator platform 78 is thus initiated.

While the elevator platform occupied its lowermost position the limit switch 338 having normally open contacts was held closed by engagement with its operating arm of the left end of the platform. Upon departure of the platform upwardly this limit switch is permitted to open whereby current from the mains 311 and 312 is cut off from the magnet coil 339 of the safety block control valve 340. This permits spring 341 to pull arm 342 of valve 340 toward the right and rotate the valve ports a quarter turn clockwise. Pressure fluid is then delivered from the supply pipe 343 through hose 344 into the bottom of the safety block control cylinder 111 where it acts upwardly upon the piston head 110 and swings the safety blocking or stop arms 107 into the path of travel of any mold plate 40 that may coast down the incline toward the end of the track from which the elevator platform is absent. Such mold plate will thereupon become arrested by means of this shock absorptive type of safety stop 107 backed up by slightly yielding fluid pressure, until such time as the elevator platform returns to its low position in readiness to receive the automatically arrested mold plate when the latter shall be released to continue its coasting travel toward the elevator platform.

To receive the mold plate as its departure from the elevated platform toward the left in Figs. 2 and 3 is initiated by the impelling movement of plunger head 99, certain feeding-in apparatus is employed located between the elevator platform and the vulcanizing machine as hereinafter described. Here it will suffice to say that once started on its journey toward the vulcanizing machine by plunger head 99, the duty of impelling mold plate 40 toward the left is taken up and carried on by such feeding-in apparatus. As the mold plate leaves its engagement with limit switch 334 the contacts of the latter automatically open and when a half or more of the length of the mold plate has passed the extreme left end of the elevator platform the contacts in limit switch 335 (see Figs. 3 and 17) are caused to open. This is accomplished mechanically by providing the toothed rack bar 13 with a continuous groove 121 (Figs. 14 and 17). This groove is deeper than the height of the rack teeth and cuts through these teeth along half of the length of each mold plate from the leading or left end of the latter in Figs. 2 and 3. Fig. 17 shows groove 121 terminated or running out at about a midway point in the length of the mold plate and partly occupying this groove is a feeler lever 148 rockable on the frame pivot 149 and biased counterclockwise by the tension of a light spring 153 stretched between the right end of lever 148 and a frame anchorage 154 in a manner normally to hold lever 148 in its position abutting against the corner of the limit switch casing as shown. The end of feeler lever 148 has a suitably shaped head for camming itself out of groove 121 as the dead end 161 of the latter passes it, after which the head of lever 148 bears smoothly against the tops of the rack teeth as they ride successively by it, the bearing surface of this lever head being long enough to straddle the tops of any two adjacent rack teeth. It is thus seen that lever 148 becomes rocked clockwise and correspondingly shifts the actuating arm of limit switch 335 when approximately a midway point in the length of the mold plate 40 reaches this limit switch. This causes the normally closed contacts in limit switch 335 to become open until the trailing or right end of the mold plate passes this switch in its travel toward the vulcanizing machine. At this time enough of the length of the mold plate has passed off from the elevator platform to relieve this platform from its duty of supporting the mold plate, and also the mold plate will have passed out of engagement with limit switch 333 and permit the contacts in the latter to open but this causes no immediate active effect in the system.

The opening of limit switch 335, however, immediately deenergizes the relay solenoid 328 permitting both pairs of relay contacts 327 and 329 to open in unison. This deenergizes the magnet coil 325 of valve 321 and spring 326 restores the latter to its full line condition shown in Fig. 22 wherein the lift pistons in cylinders 86 are deprived of fluid pressure at a rate determined by the adjustive setting of throttle valve VT. Thereupon elevator platform 78 descends empty to its bottom tilted position again, ready to receive the next returning mold plate. The departure of the platform projection 337 from limit switch 336 permits the contacts in the latter to close without any immediate active effect upon the system.

The arrival of the empty elevator platform at its bottom position closes the contacts of limit switch 338. This energizes magnet coil 339 of the safety block control valve 340 which restores the ports of this valve to full line position shown in Fig. 22. This exhausts the pressure fluid through hose 334 and pipe 331 from the lower end of cylinder 111 below piston 110 which has stood ready to resists the coasting of any returning mold block past the stop arms 107. At the same time pressure fluid is supplied through hose 330 to the top end of cylinder 111 above piston 110 forcing the latter slowly downward.

Figure 25:
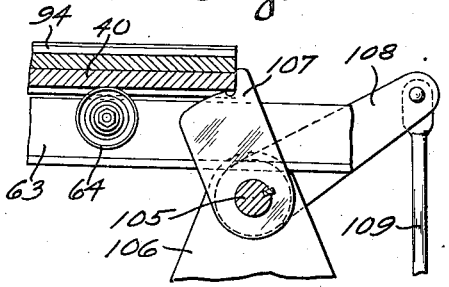
Fig. 25 is a view taken in section on the plane 25—25 in Fig. 24 looking in the direction of the arrows showing the stop arm arresting one mold plate.
Figure 26:
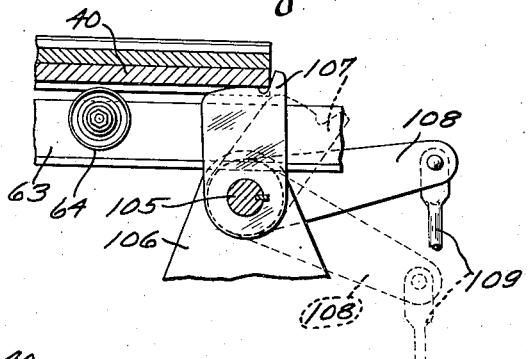
Fig. 26 is a view similar to Fig. 25 showing the stop arm acting on the mold plate to cause the latter to resume its coasting travel.

As best shown in Figs. 25 and 26, the consequent clockwise swinging of arms 107 will first slightly lift the leading edge of the arrested mold plate 40 and while bearing the weight of the latter will drag the plate toward the right a short distance and by continued clockwise swinging deliver the plate fully to the inclined track of rollers 64 and clear its path as shown in broken lines in Fig. 26. This action insures that no static friction of parts will operate to prevent the roller from starting to resume its coasting down the incline when the stop arms 107 clear its path. The mold plate then proceeds to coast on to the elevator platform which has been restored to position for receiving it.

Figure 27:
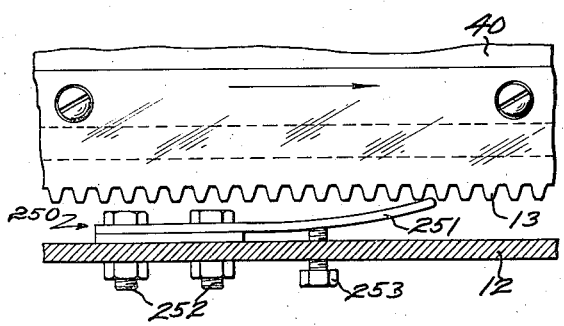
Fig. 27 is a plan view of a coasting brake device stationed at the near side of the inclined track of rollers in Fig. 1.

Unavoidable irregularities in construction make it advisable as a factor of safety to pitch the incline of the track of rollers 64 at an angle which may upon occasion cause the mold plate to pick up too much speed as it coasts down this incline toward safety stops 107. This speed may be reduced to a regulatable degree by click brakes stationed along the inclined track in such numbers and positions as necessity demands. Preferably such brakes will be arranged in pairs, the brakes of each pair flanking respectively opposite sides of the mold plates. An example of a suitable click brake is indicated as a whole by 250 in Fig. 27 and a suitable location of same is indicated in Fig. 1. The leaf spring member or click 251 is secured at one of its ends against the inner surface of the frame beam 11 or 12 of the vulcanizing machine by bolts 252 in such position that its free end is wiped by the rack teeth 13 on the edge of mold plate 40 as the latter coasts past it. The resilient pressure of the brake member 251 against the rack teeth is varied by adjusting the regulating screw 253 which has threaded engagement with the frame beam and bears on member 251 at its inner end.

All parts have now resumed the conditions in which they are represented in Fig. 22 ready to repeat the cycle of operations of lifting another mold plate and discharging it from the elevator platform. The cycle can not be repeated, however, until the trailing or right end of the last mold plate to be elevated and discharged has passed the limit switch 335 and allowed the contacts thereof to close by permitting feeler 148 to rock counterclockwise.

This leaves to be described the apparatus by which the mold plates are impelled from the elevator platform toward the left in Figs. 2 and 3 and thence on into the vulcanizing machine.

*The feed-in apparatus*

This is best shown in Figs. 2, 3, 15, and 17 to 20, inclusive. Its moving parts are mounted on a framework interposed longitudinally between the channel post 72 and the receiving end of the vulcanizing machine. This framework includes the upper angle irons 191 extending longitudinally of the apparatus from the frame of the vulcanizing machine to the channel posts 72 on a level with the topmost position of elevator platform 78, and the more widely spaced angle irons 123 which extend the entire length of the combined feeding-in apparatus and elevating and safety apparatus at a lower level than angle irons 191 to help make all of the said apparatus rigid with the frame of the vulcanizing machine to whose lower frame beams 11 and 12, the angle irons 191 are respectively attached, and to whose legs 10 the angle irons 123 are respectively attached.

The space between the top angle irons 191 is spanned by a series of freely turnable rollers 124 journaled in upright horizontally extending frame bars 125 welded or otherwise rigidly secured respectively to the top angle irons 191 so that the tops of rollers 124 fall in a common horizontal plane with the tops of the track rollers 102 in the vulcanizing machine and with the tops of rollers 89 of the elevator platform 78 when the latter is in its uppermost position.

Each frame bar 125 at a point near the channel posts 72 carries laterally and outwardly offset thereon a mold plate feeding mechanism. Each of these mechanisms includes a feeder gear 126 keyed to a vertical shaft 127 whose central portion is journaled in a stationary self-aligning combined radial and thrust type ball bearing within pillar block 128 which is secured by bolts 162 to the frame bar 125 and top angle iron 191. The top end of shaft 127 is journaled in an additional ball bearing housed at 197. These and associated parts are alike on each side of the apparatus and constitute duplicate mechanisms located as appearing in Fig. 3, and therefore only one of said mechanisms need herein be shown and described in detail.

Shaft 127 passes through clearance holes in the spaced top and bottom bearing plates 131 and 163 which are made rigid with each other by spacer posts 133, plate 131 carrying rigidly thereon the said ball bearing housing 197. The bottom bearing plate 163 is rigidly mounted on the frame bar 125 with the assistance of angle strip 134 which may be welded to both bar 125 and plate 163. A transmission pinion 164 has a pivot shaft 195 journaled in fixedly positioned bearing holes in plates 131 and 163 and is constantly in mesh with feeder gear 126 and driven thereby.

Each of plates 131 and 163 has an elongated slot 135 occupied by one extremity of a vertical stub shaft 136 which is slidable horizontally therein and serves as pivot for a receiving gear 137 which rotates always in mesh with the transmission pinion 164 and preferably is equal in pitch diameter and number of teeth to the feeder gear 126. The distance between centers of gears 126 and 137 should be an even multiple of the distance between centers of the rack teeth 13 on the mold plates because both of said two gears must at the same time be in mesh with the transmission pinion 164 and with said rack teeth.

Sandwiched between receiving gear 137 and the bearing plates 131, 163, are the inwardly extending vertically spaced arms 138 and 139 of a horizontally slidable structure, in each of which arms one end portion of the stud shaft 136 is journaled. Slide arms 138, 139 are rigidly connected at their outer bent-over ends by the vertical strap 140. A hole in each bent-over end of arms 138, 139, and through the corresponding end of connector strap 140, receives one of the two horizontally extending vertically spaced rods 141 and guides the structure comprised of these three parts so that it may shift toward and away from a mold plate traveling therepast on rollers 124. Rods 141 are rigidly supported by threaded engagement with blocks 142, respectively, which are rigid with plates 131 and 163. The outermost ends of rods 141 are also threaded and each receives an adjustor nut 143 and a lock nut 165 serving to back up a rigid stay strap 194 between which and the slidable structure a coiled spring 146 is located. One such spring surrounds each of rods 141 and is under compression tending constantly to thrust the slide arms 138, 139 and thereby the stud shaft 136 and receiving gear 137 inwardly toward a position to mesh with the toothed rack 13 on mold plate 40 as the latter is pushed off from the elevator platform 78 by plunger head 99. The innermost position which receiving gear 137 can assume may be predetermined by the contact of the turned-over ends of arms 138, 139 with the blocks 142, or if preferred, by the contact of the ends of stub shaft 136 with the inner extremity of elongated slots 135 in the bearing plates 131, 163. This limit position of the receiving gear is such as places it in proper driving mesh with the teeth of rack 13 carried on the edge of the passing mold plate, but if receiving gear 137 chances to be approached and engaged by these rack teeth when this gear is not in proper rotative position to smoothly enter into mesh with the latter, springs 146 enable the receiving gear 137 to yield outwardly and thus prevent binding until such time as this shiftable gear can automatically find and snap into its proper mesh with the rack teeth on the passing mold plate.

Each shaft 127 of feeder gears 126 carries fixed thereon below the bearing box 128 a bevel gear 155. Meshing with each of bevel gears 155 is a bevel pinion 156. Both bevel pinions 156, 156 are fixedly rotatable upon the cross shaft 157 which may be journaled in three bearing brackets 158 mounted on a spanner 159 supported at its ends by the angle irons 123. Thus the two vertical shafts 127 at each side of the apparatus are driven in unison and at like speed but in opposite rotary directions by the cross shaft 157. At its outermost end, cross shaft 157 carries the frictionally mounted sprocket wheel 160.

The construction of the mounting for sprocket wheel 160 is best shown in Fig. 15 where the tooth-carrying part of the sprocket wheel is shown as a ring member secured fixedly on a shouldered hub 167 by pins 198 or other suitable means. Between the smooth flange face of hub 167 and the corespondingly smooth face of a collar 168 pinned to cross shaft 157 is sandwiched a washer 169 of leather or other suitable clutch disc material capable of imparting power drive frictionally from the sprocket wheel 160 to shaft 157. Washer 169 may be squeezed between collar 168 and sprocket hub 167 to an adjustable degree by changing the setting of a cupped nut 170 having threaded engagement with the end portion of shaft 157 and locked thereon by the nut 171. A thrust spring 172 is under compression between nut 170 and a cupped washer 173 which is free to slide lengthwise of shaft 157. A ball thrust bearing 174 transmits the thrust of spring 172 to the sprocket wheel hub 167 so that turning of the latter can not exert any strong torque on the parts 170, 171, 172, 173.

Figs. 2 and 3 show that the drive for sprocket wheel 160 is derived by means of the long sprocket chain 175 from a smaller sprocket wheel 176 which is fast to power shaft 129. In the relationship of parts shown in the drawings, sprocket wheel 176 may have three quarters as many teeth as does sprocket wheel 160. The relationship of gearing is further such that the linear speed of travel of the teeth of feeder gears 126 should be enough greater than the linear speed of travel of the teeth of the power impelling gear 115 to make certain that the leading end of a reentering mold plate 40 impelled by these frictionally driven feeder gears shall overtake and come into tight contact with the trailing end of a preceding mold plate 40 being positively impelled into the vulcanizing machine by the power driven gears 115, before the traveling point of of meeting of said plate ends reaches gears 115.

Further apparatus is provided to insure accurate lateral positioning of the mold plate 40 as it travels from the elevator platform 78 on toward the vulcanizing machine (toward the left) in Figs. 2 and 3. This apparatus consists of certain rotatable wheels not driven by power and whose function it is to exert a suitable thrust sidewise on the traveling mold plate thereby to bring the latter into accurate lateral register with the mold plates which are preceding it into the vulcanizing machine. Figs. 3, 16 and 18 best show the construction of these aligning wheels of which one pair of cooperating axially spaced wheels 177 is carried by a cross shaft 178 and another pair of cooperative axially spaced wheels 179 is carried by a parallel cross shaft 180. Both of shafts 178 and 180 are fixedly supported in similar risers 181 at each side of the machine and span a space immediately above the path of travel of the mold plates 40 which pass therebeneath. The risers 181 carry bored lugs 182 for each shaft 178, 180 in which the shaft is removably secured by pins 183. Each of the aligning wheels 177, 179 turns freely on its respective shaft. The wheels 177 are each provided with a fixed axial thrust on both sides in the form of an inner collar 184 secured to shaft 178 by pin 185 and an outer collar 186 secured to shaft 178 by pin 187. Each of wheels 177 and 179 has a chamfered peripheral flange which acts to receive the key 94 of mold plate 40 and thrust or cam it laterally into mold centering position if the mold plate is somewhat out of central alignment. Each of wheels 179 is capable of shifting inwardly along its shaft 180 for correcting a greater degree of plate disalignment than can wheels 177 and against the resistance of a long coiled spring 188 loosely surrounding shaft 180 tending constantly to separate wheels 179. This normally keeps these wheels yieldingly positioned outwardly in limit position determined respectfully by the thrust collars 189 fixedly secured to shaft 180 by the pins 190. Collars 192 are slidable lengthwise of shaft 180.

In the operation of the feeding-in apparatus all of the gears 115, 126, and 137 are constantly turning, gears 126 and 137 traveling at equal speeds and gear 115 traveling a little more slowly. Assuming that the plunger head 99 has pushed the last mold plate to be elevated, far enough off the elevator platform 78 toward the left in Figs. 2 and 3 so that its leading end has arrived opposite the receiving gears 137, the first teeth of mold plate racks 13 will engage the teeth of receiving gears 137. If either of these receiving gears is not in proper rotative position to mesh smoothly with the rack teeth it will initially be thrust bodily outward away from the rack to prevent any bind occurring from improperly meshed teeth. Immediately, however, and before the first of the rack teeth encounter the teeth of feed gears 126, receiving gear 137 will have forced itself into correct full mesh with the rack teeth by thrusting the arriving mold plate slightly forward or backward as the case may be so that the rack teeth are thereby prepositioned by receiving gear 137 to enter initially into accurate mesh with the teeth of feed gear 126 upon reaching the latter. The teeth of receiving gear 137 are certain to find and seat promptly in the space between rack teeth 13 instead of riding upon the latter end to end because of the longitudinal movement imparted to the mold plate by the pneumatic plunger head 99 which movement is faster than the linear speed at which the teeth of gear 137 are driven.

Having thus been smoothly received by and taken into the impelling control of feed gears 126, the mold plate is fed on toward the vulcanizing machine over the track rollers 124 until the keys 94 at the leading end of the mold plate encounter the aligning wheels 179. The chamfered periphery of the flanges of the latter will accommodate any disalignment that can result from the clearance between the rack block shoulders 15 on the mold plate 40 and the ends of rollers 124 and the spring 188 will, if necessary, permit temporary displacement of either such aligning wheel inwardly upon initial contact of the mold plate key with either aligning wheel, but this same spring will immediately thereafter thrust the aligning wheel outwardly again and with it the arriving end of the mold plate. By the time the latter arrives at the fixed thrust aligning wheels 177 there is no possibility of the keys 94 failing to clear and pass the chamfered peripheral edges of wheels 177 which thereupon, if necessary, complete the correction of mold plate alignment and then hold the passing mold plate positively and in accurate lateral register with the trailing end of the last mold plate of the train that is being impelled into and through the vulcanizing machine by the gears 115. The linear speed of travel of the mold plate being impelled by feed gear 126 exceeds the linear speed of travel of the train of mold plates being impelled into and through the vulcanizing machine by power gear 115 so that the first said mold plate catches up with and abuts end-to-end against the last mold plate of the train as both are traveling toward the vulcanizing machine, firm abutting contact being maintained without binding of the impelling mechanism while the mold plates travel in unison by the clutch slippage permitted between parts 167, 168 and 169. The lateral aligning effect of wheels 177 upon the keys 94 steer the latter into accurate register with the keyways contained in the upper chain of mold sections 83 just as the keys in the lower mold sections are designed to enter and occupy such keyways of the upper mold sections in the said Patent No. 2,288,611. Eventually the reentering mold plates are transferred to the track of rollers 102 as they pass on through the vulcanizing machine held closely end-to-end by the continual pushing of power gears 115 and the simultaneous and continual holding back action of the brake gears 147.

In the event that during return travel from the work discharging end of the vulcanizing machine to the elevator platform, 78, some portions of the mold plates 40 should be found to dissipate too much of the heat imparted thereto during their travel through the vulcanizing machine, there may be provided directly beneath the lowest position of the elevator platform, suitably located heat generating burners 345 to which fuel gas may be supplied through conduit 346 under the control of valve 347 as represented in Fig. 22. As shown in Figs. 2, 3 and 4, burners 345 may be located under the respective end portions of the mold plate 40 when it is in position on the elevator platform to be elevated thereby. It sometimes develops that the end portions of the mold plates tend to lose heat more rapidly than do the midportions. As neither a mold plate 40 nor the elevator platform 78 is always present just above burners 345, useless and unwanted heat would be developed if gas were constantly kept burning at full force at burners 345. Hence an additional electromagnetic control system, as shown in Fig. 22, is employed to keep the gas turned down except when a mold plate arrives on elevator platform 78 and then to instantly and automatically turn up the gas to guarantee a maximum heat at burners 345, but only until such time as platform 78 starts to ascend and carry upwardly the mold plate which is thus being reheated.

Two additional limit switches 348 and 355 are made use of in this full gas automatic control system. Limit switch 348 has self-opening contacts and is supported by posts 71 in such position that its actuating arm is engaged by the projection 337 on platform 78 when the latter is in lowest position thereby closing the contacts of limit switch 348. Limit switch 355 also has self-opening contacts and is supported on the machine frame adjacent the inclined track of rollers 64 in such position that its actuating arm is engaged by the leading edge of a mold plate coasting down the incline and the contacts of limit switch 355 thereby closed before the leading edge of the mold plate reaches the elevator platform. Thus in the position of parts represented in Fig. 22 where the empty elevator platform is in lowest position, while the contacts of limit switch 355 are open because as yet no mold plate is approaching the elevator platform, the contacts of limit switch 348 are closed. Because limit switch 355 is open the relay solenoid 349 is cut off from connection with electrical main 211 and therefore deenergized, permitting its two self-opening pairs of contacts 350 and 351 to remain open so that current is cut off from the magnet coil 352 of gas valve 347. This permits spring 353 to hold the valve operating arm 354 in its position shown in full lines wherein the valve ports nearly, but not quite, cut off the supply of gas to burners 345. In this "turned down" position of valve 347 enough gas passes to the burners to support very small flames such as will not deliver an objectionable or wasteful amount of heat when no mold plate is present on elevator platform 78 to be heated. If preferred, the ports of valve 347 can be so arranged that the valve position referred to will completely cut off instead of merely "turn down" the supply of gas to the burners in which case a constantly burning pilot flame will be provided to reignite the heating burners when their gas supply is resumed.

Just before a mold section arrives on the elevator platform it acts to close the contacts of limit switch 355 so that relay solenoid 349 becomes energized and its two pairs of contacts 350 and 351 become instantly closed so that through contacts 350 the magnet coil 352 of valve 347 is energized and overcomes spring 353 thereby swinging arm 354 to the left and rotating the valve ports counterclockwise sufficiently to open up a maximum passage for gas through valve 347 so that large flames thereupon generate an intense heat at burners 345. It is preferable that this should occur before the mold plate actually arrives upon the elevator because otherwise the rush of air accompanying arrival of the mold section on the elevator is apt to fan out or extinguish any small pilot flame or lowered gas flames of the heating burners.

As soon as the elevator platform begins its ascent the contacts of limit switch 348 are permitted to open and this deenergizes relay solenoid 349 whose contacts 350 and 351 open and deenergize the valve magnet coil 352 whose arm and ports are now restored to their full line positions in Fig. 22 by spring 353. Although the next descent of the elevator platform will reclose limit switch 348, the fact that no mold plate is then in position to act on and close limit switch 355 will prevent the gas from again being turned up at the burners 345 until a subsequent mold plate approaches the elevator platform.

Although the foregoing description and the appended drawings disclose particular mechanisms, apparatus and systems constituting one possible embodiment of the present improvements illustrative of the principles of the invention, it will be understood that this disclosure may be suggestive of equivalent mechanisms, apparatus, systems and parts thereof which may be produced in forms differing from the disclosures hereof in many particulars. The following claims are therefore intended to be inclusive of all such equivalents and substitutes as fairly come within their terms.

What is claimed is:

1. The method of reentering rigid elongated mold sections at the trailing end of a train of said sections which includes the steps of imparting to said train advance movement thereof through a processing station while forcibly limiting the rate of said movement to a designed speed, intermittently removing one section from the leading end of said train after said section has passed through said processing station, transferring said removed section to a position behind said trailing end of the train before the latter enters said processing station, and then advancing said removed and transferred mold section in the direction of travel of said train faster than said rate of train movement by applying to said section an impelling force weaker than that which limits said rate of train movement to said designed speed.

2. The method of reentering rigid elongated mold sections at the trailing end of a train of said sections, which includes the steps of imparting to said train advance movement thereof through a processing station while forcibly limiting the rate of said movement to a designed speed, intermittently removing one section from the leading end of said train after said section has passed through said processing station, transferring said removed section to a position behind said trailing end of the train before the latter enters said processing station, and then advancing said removed and transferred mold section in the direction of travel of said train faster than said designed speed until said section overtakes said train, and thereafter further advancing said mold section in unison with said train by applying to the former an impelling force weaker than that which limits said rate of train movement to said designed speed, thereby to maintain said reentered section in abutting contact with the trailing end of said train.

3. In continuous work processing apparatus, the combination with a chain of elongated work confining structures pivotally connected to ride side by side in a straight path of work processing travel with their lengths disposed crosswise said path of travel, of a train of unconnected elongated work carrying plates supported to travel cooperatively in unison with said work confining structures in a straight route parallel to said path of travel, and having their lengths aligned with their said route of travel together with means intermittently to retrieve plates from the leading end of said train and successively reenter said plates at the trailing end of said train at a pace operative to maintain a continuous train of said plates coextensive in length with a continuous length of said chain of structures while said coextensive train and chain are engaged in work processing travel.

4. In continuous work processing apparatus, the combination defined in claim 1 in which the length of said work confining structures approximately equals the width of said work carrying plates.

5. In continuous work processing apparatus, the combination defined in claim 3 in which each of the said work confining structures has a series of grooves sunk in one face thereof and extending crosswise the width thereof in end-to-end relation respectively to similar grooves in the adjacent said confining structures, and each of the said work carrying plates has a series of grooves extending lengthwise thereof in end-to-end relation to similar grooves in the adjacent said plates, said grooves in the structures registering respectively with said grooves in the plates for forming traveling work containing chambers.

6. In apparatus for adding mold plates one by one to the trailing end of a train of similar plates traveling at a definitely controlled rate of speed into and through a processing station, the combination of means powered by a prime mover and constructed and arranged to impel said train of plates in positive unison with the linear speed of travel of said means, and power impelled plate feeding mechanism constructed and arranged to impel an additional mold plate toward the trailing end of said train by slippage affording connections and at a linear speed of travel which exceeds that performed by said train until the additional mold plate overtakes the traveling train.

7. Apparatus for feeding a retrieved mold section into tight abutting relationship to the trailing end of a traveling train of similar mold sections, including in combination, rack teeth carried by each of said mold sections and ordered in the direction of train travel, a positively driven gear arranged to rotate on a fixedly stationed pivot and positioned to engage successively with the rack teeth of the mold sections in said train in a manner to push the train progressively forward, and a frictionally driven feeder gear arranged to rotate on a fixedly stationed pivot spaced in advance of said drive gear along the path of train travel and positioned to engage successively with the rack teeth on said retrieved mold section in a manner to push the latter in the direction of train travel, the teeth of said frictionally driven gear traveling when unimpeded at a greater linear speed than do the teeth of said positively driven gear.

8. In apparatus for feeding a retrieved mold section into tight abutting relationship to the trailing end of a traveling rain of similar mold sections, the combination with rack teeth carried by each of said mold sections and ordered in the direction of travel of said train, of a feeder gear arranged to rotate in a constant direction on a fixedly stationed pivot and positioned to mesh with the rack teeth of the said retrieved mold section when the latter is thrust toward the trailing end of said train, and a receiving gear arranged to rotate in the same said direction on a shiftable pivot and thereby positionable either to mesh with or to pass the rack teeth of said retrieved mold section as the latter approaches said feeder gear, said feeder gear and receiving gear being rotated at a rate of rotary speed to cause the teeth of said two gears to travel in the same direction at a constant linear speed.

9. In apparatus as described in claim 8, the combination defined in said claim in which the distance between centers of the said feeder gear and the said receiving gear is an even multiple of the distance between the centers of the said rack teeth when both said gears are fully in mesh with said rack teeth, together with a transmission gear arranged to mesh with both the said feeder gear and the said receiving gear.

10. In apparatus as described in claim 8, the combination defined in said claim together with resilient means constructed and arranged yieldingly to urge the said receiving gear into position to mesh with the said rack teeth of the said retrieved mold section.

11. In apparatus as described in claim 8, the combination defined in said claim together with a transmission gear arranged to mesh with both the said feeder gear and the said receiving gear and constructed to rotate said receiving gear in such ratio to said feeder gear that the teeth of both said gears travel at a constant linear speed.

12. In apparatus as described in claim 8, the combination defined in said claim together with resilient means constructed and arranged yieldingly to urge the said receiving gear into position to mesh with the said rack teeth of the said retrieved mold section, and a transmission gear arranged to mesh with both said feeder gear and said receiving gear and constructed to rotate the latter in such ratio to the former that the teeth of both said gears travel at a constant linear speed.

13. Apparatus for feeding a retrieved mold section into tight abutting relationship to the trailing end of a traveling train of similar mold sections, including in combination, rack teeth carried by each of said mold sections and ordered in the direction of train travel, a positively driven gear arranged to rotate on a fixedly stationed pivot and positioned to engage successively with the rack teeth of the mold sections in said train in a manner to push the train progressively forward, a frictionally driven feeder gear arranged to rotate on a fixedly stationed pivot spaced in advance of said drive gear along the path of train travel and constantly positioned to mesh with the rack teeth on said retrieved mold section in a manner to push the latter in the direction of train travel, and a receiving gear arranged to rotate on a shiftable pivot and thereby positionable either to mesh with or to pass the rack teeth of said retrieved mold section as the latter approaches said feeder gear, said feeder gear being frictionally driven at a rate to impart to its teeth a linear speed of travel greater than that at which the teeth of said drive gear travel, and said receiving gear being driven at a rate of speed to impart to its teeth a linear speed of travel equal to that at which the teeth of said feeder gear travel.

14. The combination, with a vulcanizing machine including an elongated heat zone and elongated slab-like mold sections with power means to impel the same in the direction of their length edgewise into and through and out of said heat zone of the machine in a substantially horizontal path of travel thereby to heat said mold sections to a high temperature, of a platform outside of and adjacent to one end of said heat zone of the machine reciprocative between an upper level horizontally in line with said path of mold section travel and a level spaced below said path of travel, means in fixed relation to said machine constructed and arranged to guide said platform in its movements between said upper and lower levels, and lift means constructed and arranged to be powered on one occasion yieldingly to resist descent of said platform responsive to weight of the latter thereby to permit and retard the lowering of said platform and on another occasion to be more forcefully powered to overcome said weight and elevate said platform to its said upper level ready to receive another mold section from said heat zone of the vulcanizing machine.

15. The combination defined in claim 14 in which the said means to guide the platform includes an elbow-shaped structure disposed to steer said platform in the general direction of the said edgewise movement of the mold sections before permitting substantial lowering movement of said platform.

16. The combination defined in claim 14 in which the said lift means are so located beneath the said platform and so connected thereto in relation to the center of gravity thereof that a turning movement results from the weight of said platform combined with the uplifting force of said lift means in a direction to so tilt said platform that its end remote from the said vulcanizing machine is always first to descend from its said upper position.

17. The combination defined in claim 14 in which the said lift means are so located beneath the said platform and so connected thereto in relation to the center of gravity thereof that a turning movement results from the weight of said platform combined with the uplifting force of said lift means in a direction to so tilt said platform that its end nearest the said vulcanizing machine is always first to ascend to its said upper position.

18. The combination defined in claim 14 in which the said lift means include a pneumatically powered prime mover with an electrically actuated valve governing the energization of said prime mover, electrical control instrumentalities including a unit sensitive to the successive arrival of the said slab-like mold sections at a predetermined point in relation to the said platform, and electric circuits containing said instrumentalities forming a system through which said instrumentalities are operative to deenergize said prime mover thereby to cause said platform to descend to its said lower position when a mold section arrives at said predetermined point.

19. The combination defined in claim 14 in which the said lift means include a pneumatically powered prime mover with an electrically actuated valve governing the energization of said prime mover, electrical control instrumentalities including a unit sensitive to the successive arrival of the said slab-like mold sections at a predetermined point in relation to the said platform, and electric circuits containing said instrumentalities forming a system through which said instrumentalities are operative to energize said prime mover thereby to cause said platform to ascend to its said upper position when a mold section arrives at said predetermined point.

20. The combination defined in claim 14 together with an electrically governed device operative to effect the up and down movements of the said lift means, a limit switch electrically connected to initiate action of said device and mounted on the said lift means in a manner to be engaged by one of the said mold sections upon its arrival at a predetermined point in relation to the said platform and thereby actuated in a manner to cause said device to initiate the descent of said platform to its said lower position.

21. The combination defined in claim 14 together with an electrically governed device operative to effect the up and down movements of the said lift means, a limit switch electrically connected to initiate action of said device and mounted on the said support means in a manner to be engaged by one of the said mold sections upon its arrival at a predetermined point in relation to the said platform and thereby actuated in a manner to cause said device to initiate the ascent of said platform to its said upper position.

22. The combination defined in claim 14 in which the said lift means include two upright power cylinders housing lift pistons and spaced from each other in alignment with the length of the said vulcanizing machine, connecting rods extending upwardly from each of said pistons and engaging with the said platform at points correspondingly spaced from each other in alignment with said length of the vulcanizing machine, together with means to supply a pressure fluid simultaneously to said cylinders, said means being operably sensitive to the arrival of one of the said mold sections at a predetermined point relative to said platform.

23. The combination defined in claim 14 in which the said lift means include two upright power cylinders housing lift pistons and spaced from each other in alignment with the length of said processing machine, connecting rods extending upward from each of said pistons and engaging with the said carrier handling platform at points correspondingly spaced from each other in alignment with said length of the vulcanizing machine, together with means to exhaust a pressure fluid simultaneously from said cylinders, said means being operably sensitive to the arrival of one of the said mold sections at a predetermined point relative to said platform.

24. The combination with a vulcanizing machine including an elongated heat zone and elongated slab-like mold sections with power means to impel the same in the direction of their length edgewise into and through and out of said heat zone of the machine in a substantially horizontal path of travel thereby to heat said mold section to a high temperature, of a platform outside of and adjacent to one end of said heat zone of the machine reciprocative between an upper position on a level with said path of mold section travel and a lower positioned spaced farther below said level, means to guide said platform in its movements between said upper and lower position including an elbow-shaped structure disposed to steer said platform in the general direction of the said edgewise movement of the mold sections before permitting substantial lowering of said platform, upright power cylinders each housing a piston connected to assist in the lifting of said platform, and each hinged on a pivotal support at its bottom end thereby to permit said platform to perform movement in a diversity of directions.

25. The combination with a vulcanizing machine including an elongated heat zone and elongated slab-like mold sections with power means to advance the same in the direction of their length edgewise into and through and out of said heat zone of the machine in a substantially horizontal path of travel thereby to heat said mold sections to a high temperature, of a platform outside of and adjacent to one end of said heat zone of the machine reciprocative between an upper horizontal position parallel and on a level with said path of mold section travel and a lower tilted position spaced below said level, means in fixed relation to said machine constructed and arranged to guide said platform in its movements between said upper and lower positions, and a plurality of vertically movable lift devices located at different distances from said end of the vulcanizing machine beneath said platform and connected to the latter, the said lift device which is most remote from said machine being powered and arranged to move through a greater vertical distance than does the said lift device nearest said machine thereby to permit tilting of said platform.

26. The combination with a vulcanizing machine including an elongated heat zone and elongated slab-like mold sections with power means to advance the same in the direction of their length edgewise into and through and out of said heat zone of the machine in a substantially horizontal path of travel thereby to heat said mold sections to a high temperature, of a platform outside of and adjacent one end of the machine reciprocative between an upper horizontal position parallel and on a level with said path of mold section travel and a lower tilted position spaced below said level, means to guide said platform in its movements between said upper and lower positions, and a plurality of vertically movable lift devices located at different distances from said end of the vulcanizing machine beneath said platform and connected to the latter, the said lift device which is nearest said machine being powered and arranged to move through a greater vertical distance than does said lift device most remote from said machine thereby to permit tilting of said platform.

27. In apparatus of the character described, the combination with an elevator platform, of track means adjacent one end of said platform disposed to deliver an elongated endwise coasting mold section onto said platform, a power cylinder mounted on said platform displaced from the path of coasting travel of the arriving mold section but disposed substantially parallel therewith, a piston and piston rod operative lengthwise said cylinder having a buffer head on the end of said piston rod farthest from said track means and disposed in said path of coasting travel of said mold section, thereby to be engaged by the leading end of said mold section for arresting the latter with a cushioning effect.

28. In apparatus of the character described, the combination with an elevator platform, of track means disposed to receive endwise from said platform an elongated mold section longitudinally slidable thereon thereby to assist in unloading said mold section from said platform, a power cylinder mounted on said platform displaced from the path of sliding movement of said mold section but disposed substantially parallel therewith, a piston operative lengthwise in said cylinder having an impeller head exterior thereof extending into engagement with the said mold section, and means to inject fluid pressure into said cylinder at the proper side of said piston to impel said mold section in a direction away from said platform toward and onto said track means thereby to initiate the unloading of said mold section from said platform.

29. In apparatus of the character described, the combination defined in claim 27, together with means for upon occasion controllably injecting into and exhausting from said cylinder on either side of the said piston a pressure fluid in a manner to convert the said buffer head of the piston into a prime mover operative to impel the said mold section in a direction reverse to that in which it coasts onto said elevator platform whereby said piston can initiate the unloading of said mold section from said platform.

30. In apparatus of the character described, in combination, an elevator, track means leading laterally away from said elevator an unloading plunger carried by said elevator, a mold section to be lifted by movement of said elevator in a generally vertical direction and also to be unloaded from said elevator onto said track means by movement of said plunger in a generally horizontal direction, a prime mover for effecting said vertical movement of the elevator, a separate prime mover for effecting said horizontal movement of the plunger, and a system of electrical control devices and electric circuits containing the same operative to initiate and terminate the actions of said prime movers, a limit switch in said circuit mounted on said elevator in position to be thrown by movement of said article relative to the elevator and another limit switch stationed near said elevator in position to be thrown by movement of said elevator relative to said track means, said limit switches thereby automatically determining the sequence of movements of said elevator relative to said track and of said article relative to said elevator.

31. In apparatus of the character described, the combination with a relatively thin slab-like elongated mold section having a continuous rack of gear teeth disposed along its edge for propelling said mold section in a lengthwise path of travel, of electrically controlled mold section handling apparatus to be operated in predetermined time relation to the travel of said mold section, a limit switch for electrically controlling said apparatus stationed adjacent to the traveling toothed edge of said carrier and having an operating arm, a groove cut into a portion only of the entire length of said rack of gear teeth, and a lever having a follower end and rockable on a pivot stationed to interpose said follower end between said operating arm of the limit switch and the bottom of said groove.

32. In apparatus of the character described, the combination with a continually traveling chain of interconnected short mold sections and a cooperative train of relatively separable long mold sections constructed and mounted continually to travel along one stretch of said train in unison and in face-to-face register with said short mold sections laterally, of means to steer said long mold sections into a path for accurate register laterally with said short mold sections while the former are approaching the latter, including a shaft disposed crosswise the path of travel of said long mold sections and closely adjacent thereto, shouldered wheels spaced axially apart on said shaft and slidable toward each other therealong each of said wheels having simultaneous engagement with the same long mold section while the latter is passing the former in its approach toward said chain of short mold sections, a coiled spring surrounding said shaft between said wheels and pressing in opposite directions against said wheels at each of its ends respectively, and thrust means on said shaft limiting the axial separating movement of said wheels responsive to said spring.

33. In apparatus of the character described, the combination defined in claim 32, together with a second shaft extending parallel to the first said shaft between the latter and the said train of short mold sections, and additional shouldered wheels spaced axially apart on said second shaft and fixed thereto, said additional wheels having their shoulders chamfered sufficiently to receive the leading end of one of said long mold sections if slightly disaligned therefrom and to cam said mold section laterally into positively corrected alignment with said wheel shoulders as the former pass the latter.

34. In an elongated vulcanizing machine including an inclined track disposed lengthwise of said machine for supporting a mold section coasting from one to the other end of said machine, a safety stop device for arresting said mold section on occasion at a predetermined point along said track, including in combination with said track, spaced devices at respectively opposite ends of said track to deliver mold sections thereto and receive mold sections therefrom, an arm at a point along said track intermediate said devices swingable about an axis disposed transverse said track into the path of and toward the approaching end of the coasting mold section, a pneumatically operated unit connected to said arm in a manner to resist the swinging thereof away from said path thereby to arrest said mold section and cushion the shock of impact therewith, and a control operated by one of said devices for admitting to and exhausting from said unit a pressure fluid, whereby said arm is alternately rendered operative and inoperative to arrest said mold section.

35. The combination with an elevator platform and an inclined track for guiding therealong heavy mold sections toward and onto said platform, of safety stop apparatus for arresting a mold section coasting down said track in the absence of said elevator platform in a position to receive it, said apparatus including a retractable stop positionable to occupy or to clear the path of the down-coasting mold section, an electrically controlled prime mover adapted when energized to shift said stop into said path of movement, and a limit switch sensitive to the arrival and departure of said elevator platform from its said position to receive the coasting mold section and electrically connected to cause energization of said prime mover when said platform leaves its said position.

36. In combination with a continuous process vulcanizing machine, apparatus for successively reheating and reentering at one end of a train of elongated slab-like unconnected mold sections successive mold sections which have been retrieved and returned from a far end of said train, including an elevator for said mold sections, a zone of heat close to said elevator, and means to arrest the returning mold sections one by one and cause them to dwell upon said elevator in said zone of heat for a sufficient period to replenish the heat in said mold sections lost therefrom during the return of said mold sections from said far end of said train.

37. In combination with a continuous process vulcanizing machine, apparatus for successively reheating and reentering mold sections as defined in claim 36, together with a source of heat arranged to deliver heat to said zone of heat, and means to increase and decrease the intensity of heat furnished by said source of heat to said zone of heat, said means being operatively sensitive to the approach of one of the said mold sections toward the said elevator and also operatively sensitive to the departure of said elevator from a predetermined position.

38. In an elongated vulcanizing machine including an antifriction inclined track disposed lengthwise of said machine for supporting a mold section coasting from one to the other end of said machine, a speed braking mechanism for reducing the momentum of said coasting mold section embodying in combination with said track, a plate-like mold section free to coast down said track, a series of teeth ordered lengthwise along an edge of said section, a yieldable click stationed and positioned to be wiped successively by said teeth as the section coasts down the track, and means to adjust the yielding ability of said click for determining the speed-braking force exerted by said click upon the teeth of said section.

LUDOLF H. DE WYK, Jr.